US012708864B2

(12) United States Patent
Milani et al.

(10) Patent No.: US 12,708,864 B2
(45) Date of Patent: Aug. 18, 2026

(54) CONTINUOUS LIQUID-LIQUID CHROMATOGRAPHIC SEPARATION OF CHEMICAL SPECIES USING MULTIPLE LIQUID PHASES AND RELATED SYSTEMS AND ARTICLES

(71) Applicant: Zaiput Flow Technologies LLC, Waltham, MA (US)

(72) Inventors: Lorenzo Milani, Woburn, MA (US); Trevor Charles Murray, Everett, MA (US); Robert Viano, Medford, MA (US); Andrea Adamo, Cambridge, MA (US); Róbert Örkényi, Cambridge (GB)

(73) Assignee: Zaiput Flow Technologies LLC, Waltham, MA (US)

( * ) Notice: Subject to any disclaimer, the term of this patent is extended or adjusted under 35 U.S.C. 154(b) by 1100 days.

(21) Appl. No.: 17/840,884

(22) Filed: Jun. 15, 2022

(65) Prior Publication Data

US 2023/0405489 A1 Dec. 21, 2023

(51) Int. Cl.
*B01D 11/04* (2006.01)
*B01D 11/00* (2006.01)

(52) U.S. Cl.
CPC ...... *B01D 11/0426* (2013.01); *B01D 11/0415* (2013.01); *B01D 11/0488* (2013.01); *B01D 2011/002* (2013.01)

(58) Field of Classification Search
CPC ............ B01D 11/0426; B01D 11/0415; B01D 11/0488; B01D 2011/002
See application file for complete search history.

(56) References Cited

U.S. PATENT DOCUMENTS 706,812 A 8/1902 Fenn
2,985,589 A 5/1961 Broughton et al.
3,696,107 A 10/1972 Neuzil
3,706,812 A 12/1972 Derosset et al.
3,761,533 A 9/1973 Otani et al.
5,093,004 A 3/1992 Hotier et al.
5,114,590 A 5/1992 Hotier et al.
7,422,685 B2 9/2008 Couillard et al.
8,895,078 B2 11/2014 Mueller
9,321,715 B2 4/2016 Kelliher et al.
10,501,432 B2 * 12/2019 Runco ................. B01J 20/3231
10,624,872 B1 4/2020 McCorkle et al.
10,941,131 B1 3/2021 Grondin et al.
(Continued)

FOREIGN PATENT DOCUMENTS

CN 101732890 B 1/2012
FR 2103302 A5 4/1972
(Continued)

OTHER PUBLICATIONS

Simmons et al. (Two-Stage Gas-Liquid Chromatography, vol. 30, No. 1, Jan. 1958, pp. 32-35) (Year: 1958).*
(Continued)

*Primary Examiner* — Youngsul Jeong
(74) *Attorney, Agent, or Firm* — Wolf, Greenfield & Sacks, P.C.

(57) ABSTRACT

The present disclosure is related to the continuous liquid-liquid chromatographic separation of chemical species using multiple liquid phases and related systems and articles.

17 Claims, 4 Drawing Sheets

(56) References Cited

U.S. PATENT DOCUMENTS

| | | | | |
|---|---|---|---|---|
| 11,478,447 | B2 | 10/2022 | Rigsbee et al. | |
| 11,548,864 | B1 | 1/2023 | Milani et al. | |
| 12,187,695 | B2 | 1/2025 | Milani et al. | |
| 2011/0306801 | A1 * | 12/2011 | Schucker | C02F 1/26 568/918 |
| 2018/0036278 | A1 | 2/2018 | Rutz | |
| 2021/0002247 | A1 | 1/2021 | Ham et al. | |
| 2022/0002259 | A1 * | 1/2022 | Tegen | C07C 37/82 |
| 2023/0416217 | A1 | 12/2023 | Milani et al. | |

FOREIGN PATENT DOCUMENTS

| | | | |
|---|---|---|---|
| FR | 2651148 | A1 | 3/1991 |
| FR | 2651149 | A1 | 3/1991 |
| JP | 2019-108340 | A | 7/2019 |
| WO | WO 2005/011835 | A1 | 2/2005 |
| WO | WO 2010/010366 | A1 | 1/2010 |

OTHER PUBLICATIONS

Peeva et al. (Continuous purification of active pharmaceutical ingredients using multistage organic solvent nanofiltration membrane cascade, Chemical Engineering Science, 116 (2014) 183-194) (Year: 2014).*

Weeranoppanant et al. (Design of Multistage Counter-Current Liquid-Liquid Extraction for Small-Scale Applications, Ind. Eng. Chem. Res. 2017, 56, 4095-4103) (Year: 2017).*

Invitation to Pay Additional Fees for International Application No. PCT/US2023/025273 dated Sep. 27, 2023.

Runco et al., The separation of [Delta]8-THC, [Delta]9-THC, and Their Enantiomers. Waters Corporation. Sep. 2016: 11 pages.

International Preliminary Report on Patentability (Chapter 1) for International Application No. PCT/US2023/025273 dated Dec. 26, 2024.

[No Author Listed], Introduction to Continuous (SMB) Chromatography. Jul. 16, 2014. https://sembabio.com/simulated-moving-bed-chromatography/ [last accessed Jun. 21, 2022]. 4 pages.

Adelmann et al., Influence of physical properties and operating parameters on hydrodynamics in Centrifugal Partition Chromatography. J Chromatogr A. Aug. 12, 2011;1218(32):5401-13. doi: 10.1016/j.chroma.2011.01.064. Epub Jan. 27, 2011.

Berthod et al., Countercurrent chromatography: people and applications. J Chromatogr A. May 8, 2009;1216(19):4206-17. doi: 10.1016/j.chroma.2008.10.071. Epub Oct. 22, 2008.

Chen et al., Preparative isolation and purification of cuminaldehyde and p-menta-1,4-dien-7-al from the essential oil of *Cuminum cyminum* L. by high-speed counter-current chromatography. Anal Chim Acta. Mar. 9, 2011;689(1):149-54. doi: 10.1016/j.aca.2011.01.038. Epub Jan. 25, 2011.

Choi et al., NMR assignments of the major cannabinoids and cannabiflavonoids isolated from flowers of *Cannabis sativa*. Phytochem Anal. Nov.-Dec. 2004;15(6):345-54. doi: 10.1002/pca.787.

Foucault, Solvent Systems in Centrifugal Partition Chromatography. Chromatographic Science Series. 1994. Foucault, Ed. Chapter 4:71-97.

Friesen et al., Countercurrent Separation of Natural Products: An Update. J Nat Prod. Jul. 24, 2015;78(7):1765-96. doi: 10.1021/np501065h. Epub Jul. 15, 2015.

Foucault, Theory of Centrifugal Partition Chromatography. In: Centrifugal Partition Chromatography. Chromatographic Science Series. 1994. Foucault, Ed. Chapter 2:25-49.

Ganetsos et al., Preparative and Production Scale Chromatography. 1993. Ganetsos et al., Eds. 372 pages.

Gomes et al., Simulated Moving Bed Chromatography: From Concept to Proof-of-Concept. Chem Eng Tech. Dec. 2, 2011;35(1):17-34.

Han et al., Preparative separation of gambogic acid and its C-2 epimer using recycling high-speed counter-current chromatography. J Chromatogr A. Sep. 15, 2006;1127(1-2):298-301. doi: 10.1016/j.chroma.2006.07.044. Epub Aug. 2, 2006.

Hazekamp et al., Chromatographic and Spectroscopic Data of Cannabinoids from *Cannabis sativa* L.. J Liquid Chromatogr Rel Tech. 2005;28(15):2361-82.

Hazekamp et al., Preparative Isolation of Cannabinoids from Cannabis sativa by Centrifugal Partition Chromatography. J Liquid Chromatogr Rel Tech. Apr. 2004;27(15):2421-39.

Hazekamp, Cannabis: extracting the medicine. Doctoral Thesis. Leiden University. Sep. 5, 2007:190 pages.

Ito, Golden rules and pitfalls in selecting optimum conditions for high-speed counter-current chromatography. J Chromatogr A. Feb. 18, 2005;1065(2):145-68. doi: 10.1016/j.chroma.2004.12.044.

Lorantfy et al., Continuous Industrial-Scale Centrifugal Partition Chromatography with Automatic Solvent System Handling: Concept and Instrumentation. Org Process Res Dev. Nov. 6, 2020;24(11):2676-88.

Margraff, Preparative Centrifugal Partition Chromatography. Chromatographic Science Series. 1994. Foucault, Ed. Chapter 12:331-350.

Orkenyi et al., Continuous Synthesis and Purification by Coupling a Multistep Flow Reaction with Centrifugal Partition Chromatography. Angew Chem Int Ed Engl. Jul. 17, 2017;56(30):8742-8745. doi: 10.1002/anie.201703852. Epub Jun. 19, 2017.

Queiroga et al., High-speed countercurrent chromatography as a tool to isolate nerolidol from the *Baccharis dracunculifolia* volatile oil. J Ess Oil Res. May 2014;26(5):334-37.

Strube et al., Comparison of Batch Elution and Continuous Simulated Moving Bed Chromatography. Org Proc Res Dev. Jul. 18, 1998;2(5):305-19.

Wang et al., Bioassay-guided isolation of an active compound with protein tyrosine phosphatase 1B inhibitory activity from Sargassum fusiforme by high-speed counter-current chromatography. J Sep Sci. Nov. 2016;39(22):4408-4414. doi: 10.1002/jssc.201600691. Epub Oct. 24, 2016.

Weeranoppanant et al., Design of Multistage Counter-Current Liquid-Liquid Extraction for Small-Scale Applications. Ind Eng Chem Res. Mar. 22, 2017;56(14):4095-103.

Xie et al., Isolation and purification of nootkatone from the essential oil of fruits of *Alpinia oxyphylla* Miquel by high-speed counter-current chromatography. Food Chem. Nov. 2009; 117(2):375-380. doi: 10.1016/j.foodchem.2009.04.011.

International Search Report and Written Opinion for International Application No. PCT/US2023/025273 dated Nov. 20, 2023.

* cited by examiner

CONTINUOUS LIQUID-LIQUID CHROMATOGRAPHIC SEPARATION OF CHEMICAL SPECIES USING MULTIPLE LIQUID PHASES AND RELATED SYSTEMS AND ARTICLES

TECHNICAL FIELD

Continuous liquid-liquid chromatographic separation of chemical species using multiple liquid phases and related systems and articles are generally described.

SUMMARY

The present disclosure is related to the continuous liquid-liquid chromatographic separation of chemical species using multiple liquid phases and related systems and articles. The subject matter of the present disclosure involves, in some cases, interrelated products, alternative solutions to a particular problem, and/or a plurality of different uses of one or more systems and/or articles.

In some aspects, liquid-liquid chromatographic separator systems are provided. In some embodiments, the liquid-liquid chromatographic separator system comprises three or more separator stages, wherein the three or more separator stages are arranged in series with one another from a first separator stage to a last separator stage, with one or more intermediate separator stages positioned between the first separator stage and the last separator stage, wherein each of the three or more separator stages comprises a liquid inlet and two liquid outlets; and a feed liquid inlet configured to receive a feed liquid stream comprising a first solute and a second solute; wherein: the first separator stage comprises: a first liquid inlet configured to receive liquid comprising at least a portion of the first solute and at least a portion of the second solute, a liquid outlet configured to output a liquid having a mole fraction of the first solute relative to the sum of the first solute and the second solute that is larger than a mole fraction of the first solute relative to the sum of the first solute and the second solute in the liquid received by the first liquid inlet of the first separator stage, and a liquid outlet configured to output a liquid having a mole fraction of the second solute relative to the sum of the first solute and the second solute that is larger than a mole fraction of the second solute relative to the sum of the first solute and the second solute in the feed liquid stream; and the last separator stage comprises: a last liquid inlet configured to receive a liquid comprising at least a portion of the first solute and at least a portion of the second solute, a liquid outlet configured to output a liquid having a mole fraction of the first solute relative to the sum of the first solute and the second solute that is larger than a mole fraction of the first solute relative to the sum of the first solute and the second solute in the feed liquid stream, and a liquid outlet configured to output a liquid having a mole fraction of the second solute relative to the sum of the first solute and the second solute that is larger than a mole fraction of the second solute relative to the sum of the first solute and the second solute in the liquid received by the last liquid inlet.

In certain aspects, methods are provided. In some embodiments, the method comprises transporting a feed liquid stream comprising a first solute and a second solute into a feed liquid inlet of a liquid-liquid chromatographic separator system, wherein the liquid-liquid chromatographic separator system comprises three or more separator stages arranged in series with one another from a first separator stage to a last separator stage, with one or more intermediate stages positioned between the first separator stage and the last separator stage; transporting a liquid comprising at least a portion of the first solute and at least a portion of the second solute into a first liquid inlet of a first separator stage, such that the first separator stage produces: a liquid having a mole fraction of the first solute relative to the sum of the first solute and the second solute that is larger than a mole fraction of the first solute relative to the sum of the first solute and the second solute in the liquid received by the first liquid inlet of the first separator stage, and a liquid having a mole fraction of the second solute relative to the sum of the first solute and the second solute that is larger than a mole fraction of the second solute relative to the sum of the first solute and the second solute in the feed liquid stream; and transporting a liquid comprising at least a portion of the first solute and at least a portion of the second solute into a last liquid inlet of the last separator stage, such that the last separator stage produces: a liquid having a mole fraction of the first solute relative to the sum of the first solute and the second solute that is larger than a mole fraction of the first solute relative to the sum of the first solute and the second solute in the feed liquid stream, and a liquid having a mole fraction of the second solute relative to sum of the first solute and the second solute that is larger than a mole fraction of the second solute relative to the sum of the first solute and the second solute in the liquid received by the last liquid inlet.

Other advantages and novel features of the present disclosure will become apparent from the following detailed description of various non-limiting embodiments of the disclosure when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present disclosure will be described by way of example with reference to the accompanying figures, which are schematic and are not intended to be drawn to scale unless otherwise indicated. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures.

DETAILED DESCRIPTION

Figure 1:
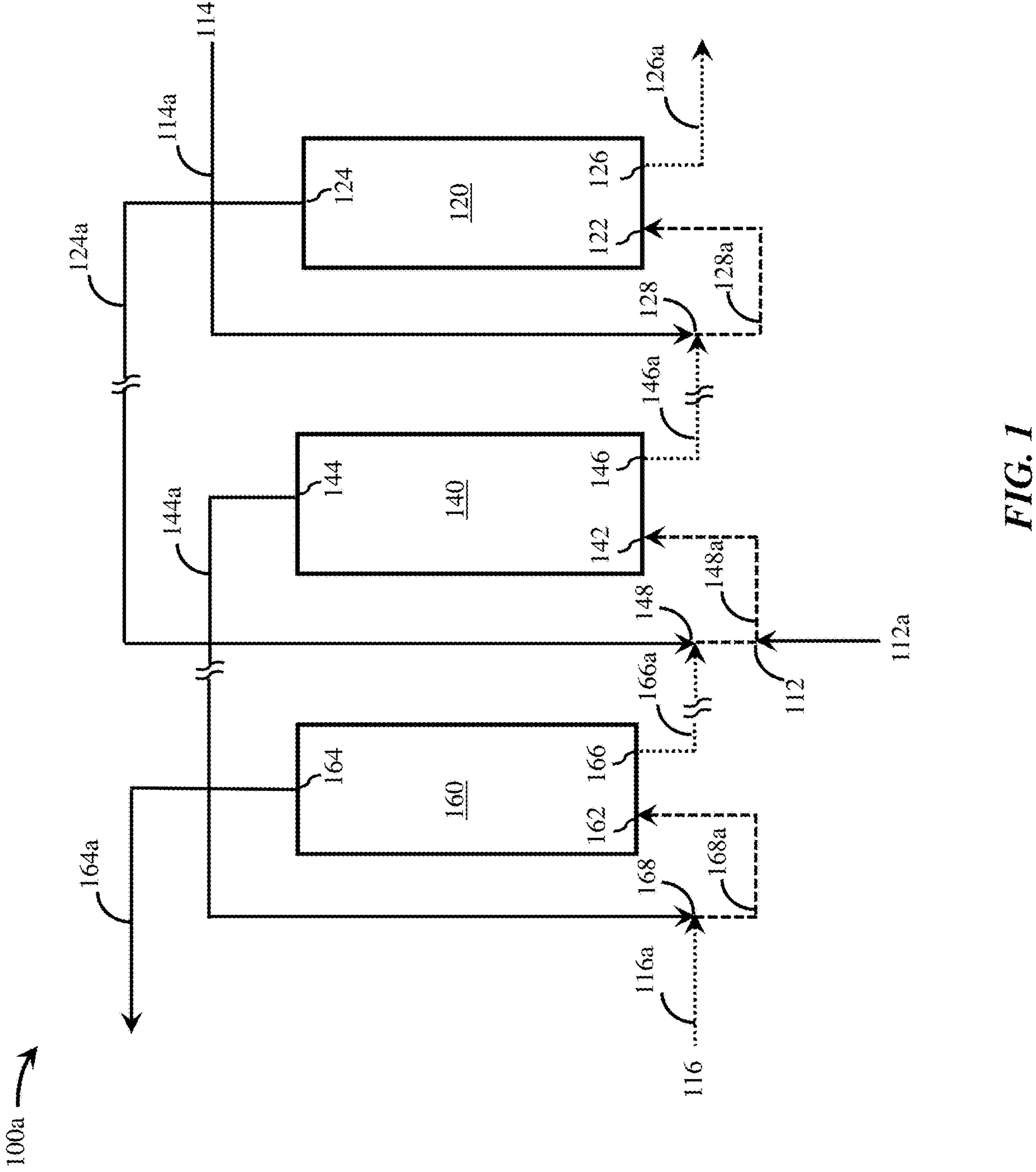
FIG. 1 is a schematic illustration showing a liquid-liquid chromatographic separator system comprising three or more separator stages, according to some embodiments.

Continuous multi-stage separation of chemical species using multiple liquid phases and related systems and articles are generally described. Certain aspects of the present disclosure are directed to the discovery that the use of multistage liquid-liquid countercurrent chromatographic separator systems can allow for highly efficient and targeted separation of a chemical species (e.g., a first solute) from one or more additional chemical species (e.g., a second solute) in a feed liquid stream. Certain embodiments are related to the discovery that the use of two mobile phases, e.g., such as a first liquid phase and a second liquid phase that is distinct from (e.g., immiscible with) the first liquid phase, can provide, in certain instances, one or more of a variety of operational advantages compared to conventional systems. Such operational advantages include, but are not limited to, a high throughput continuous extraction process, recycling of solvent(s), ease of scalability, a high degree of separation, and/or a high extraction efficiency associated with a target chemical species. Some embodiments are related to the discovery that effective separation of a specific chemical species can be achieved by using liquids that provide different partition coefficients of the chemical species and the one or more additional chemical species in the two mobile phases. It has also been recognized, within the context of the present disclosure, that the systems and methods described herein can be advantageously employed in the purification of any of a variety of chemical species. Compared to conventional systems and methods, in accordance with certain embodiments, systems and methods described herein can allow one to effectively target a specific chemical species, use less extraction solvent(s) and/or extraction stages, and/or reduce overall operational costs associated with the separation process.

In some embodiments, liquid-liquid chromatographic separator systems and related methods are described. The separator systems and related methods can be employed for separating a first solute from a second solute in a feed liquid stream using two mobile phases (e.g., a first liquid phase and a second liquid phase distinct from the first liquid phase) based on the ability of the two solutes to partition into different mobile phases to a different degree and the ability of the two mobile phases to phase separate. The separator systems can comprise, in some embodiments, a series of liquid-liquid chromatographic separator stages, each of which is capable of phase separating a mixed liquid stream comprising the two mobile phases into two liquid streams, e.g., one comprising predominantly one mobile phase having a mole fraction of the first solute relative to the sum of the first solute and the second solute that is larger than a mole fraction of the first solute relative to the sum of the first solute and the second solute in the mixed liquid stream received by the separator stage, and one comprising predominantly the other mobile phase having a mole fraction of the second solute relative to the sum of the first solute and the second solute that is larger than a mole fraction of the second solute relative to the sum of the first solute and the second solute in the mixed liquid stream received by the separator stage.

While many of the embodiments described herein include a first solute and a second solute, it should be understood that more than two solutes can be present, in certain embodiments.

In association with certain of the embodiments described herein, certain liquids are said to be "enriched" in a first solute or a second solute, relative to another liquid. In this context, a first liquid is said to be "enriched" in the first solute relative to a second liquid if the mole fraction of the first solute relative to the sum of the first solute and the second solute in the first liquid is higher than the mole fraction of the first solute relative to the sum of the first solute and the second solute in the second liquid. Similarly, a first liquid is said to be "enriched" in the second solute relative to a second liquid if a mole fraction of the second solute relative to the sum of the first solute and the second solute in the first liquid is higher than a mole fraction of the second solute relative to the sum of the first solute and the second solute in the second liquid. In some instances in which a first liquid is enriched in a solute relative to a second liquid, it is particularly advantageous if the concentration of the solute in the first liquid is higher than the concentration of that solute in the second liquid. For example, in some embodiments, it is particularly advantageous if the separator stage (e.g., each separator stage within the multi-stage system) produces (1) a first liquid that has a higher concentration of first solute than the concentration of the first solute in the stream that is input to the separator stage and (2) a second liquid that has a higher concentration of second solute than the concentration of the second solute in the stream that is input to the separator stage.

To calculate a mole fraction of a first solute relative to the sum of the first solute and the second solute in a particular liquid, one would divide the number of moles of the first solute present in the liquid by the sum of the number of moles of the first solute present in the liquid and the number of moles of the second solute present in the liquid. This is shown mathematically as follows:

$$x_1 = \frac{n_1}{n_1 + n_2}$$

where $x_1$ is the mole fraction of the first solute relative to the sum of the first solute and the second solute in the liquid, $n_1$ is the number of moles of the first solute in the liquid, and $n_2$ is the number of moles of the second solute in the liquid. Similarly, to calculate a mole fraction of a second solute relative to the sum of the first solute and the second solute in a particular liquid, one would divide the number of moles of the second solute present in the liquid by the sum of the number of moles of the first solute present in the liquid and the number of moles of the second solute present in the liquid. This is shown mathematically as follows:

$$x_2 = \frac{n_2}{n_1 + n_2}$$

where $x_2$ is the mole fraction of the second solute relative to the sum of the first solute and the second solute in the liquid, $n_1$ is the number of moles of the first solute in the liquid, and $n_2$ is the number of moles of the second solute in the liquid.

Certain of the methods disclosed herein can involve, in some embodiments, transporting a feed liquid stream comprising two solutes and at least one of the two mobile phases (and, in some cases, both mobile phases) into the separator system described herein. The methods can, in certain embodiments, allow for separation of the two solutes via differential partitioning of the two solutes into different mobile phases. In some such embodiments, subsequent phase separation of the mobile phases (e.g., immiscible mobile phases) can produce two liquid streams, e.g., one stream comprising predominantly one mobile phase having a mole fraction of the first solute relative to the sum of the first solute and the second solute that is larger than a mole fraction of the first solute relative to the sum of the first solute and the second solute in the feed liquid stream, and a second stream comprising predominantly the other mobile phase having a mole fraction of the second solute relative to the sum of the first solute and the second solute that is larger than a mole fraction of the second solute relative to the sum of the first solute and the second solute in the feed liquid stream.

Figure 2:
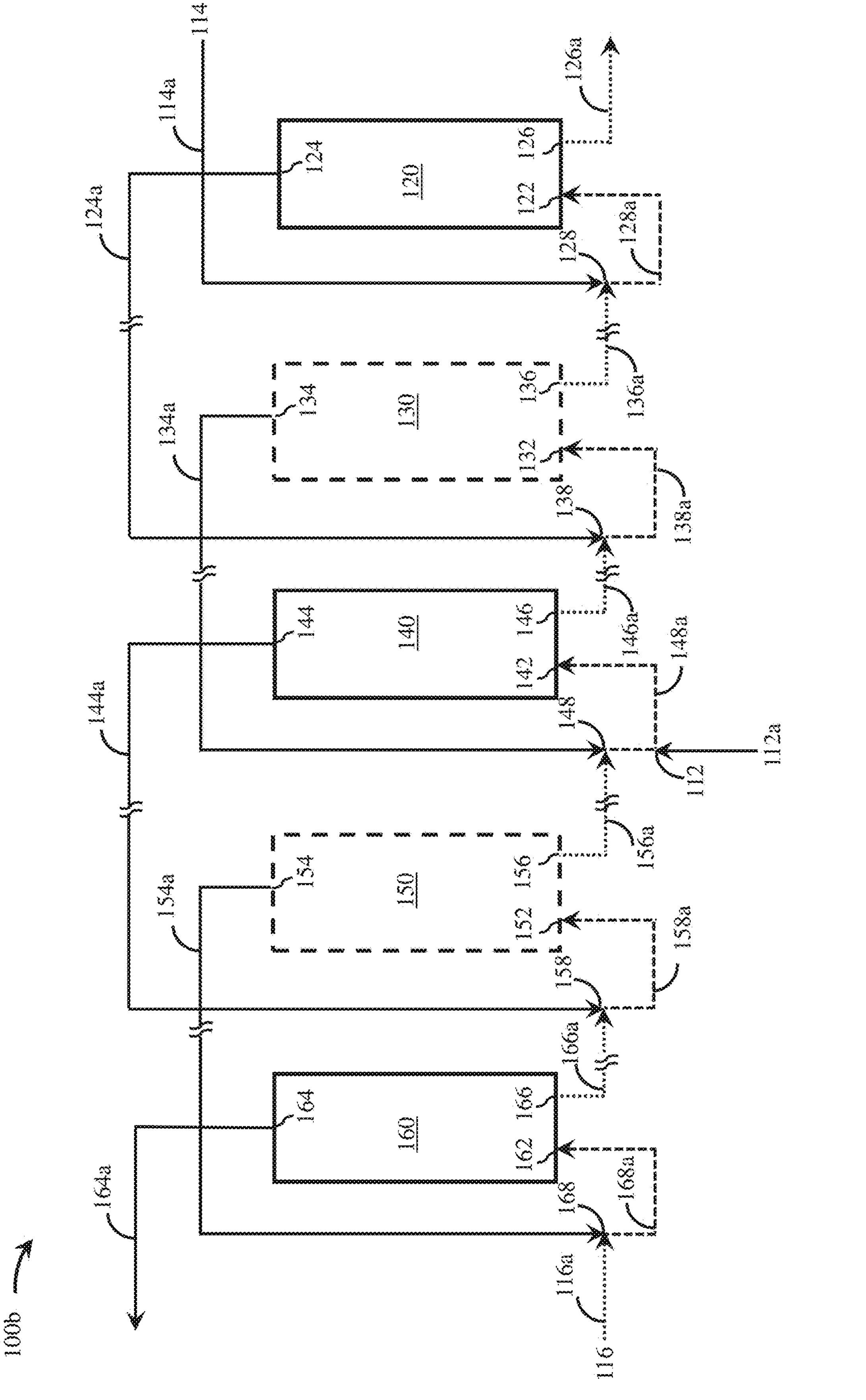
FIG. 2 is a schematic illustration showing a liquid-liquid chromatographic separator system comprising five or more separator stages, according to some embodiments.

FIGS. 1-2 are schematic illustrations of non-limiting embodiments of liquid-liquid chromatographic separator systems comprising a plurality of separator stages. The system in FIG. 1 depicts three separator stages (and can include more separator stages), while the system in FIG. 2 depicts five separator stages (and can include more separator stages). These figures are referred to throughout the disclosure below.

In some embodiments, a liquid-liquid chromatographic separator system is described. The liquid-liquid chromatographic separator system, in certain embodiments, is a multi-stage liquid-liquid chromatographic separator system comprising a plurality of separator stages (e.g., liquid-liquid phase chromatographic separator stages). The liquid-liquid chromatographic separator system may comprise any of a variety of appropriate numbers of separator stages, including, but not limited to, three or more stages, four or more stages, five or more stages, six or more stages, eight or more stages, ten or more stages, twenty or more stages, thirty or more stages, or fifty or more stage stages (and/or up to 100 stages, up to 500 stages, up to 1000 stages, or more).

In some embodiments, the plurality of separator stages within the liquid-liquid chromatographic separator system are arranged in series with one another from a first separator stage to a last separator stage and fluidically connected to one another in succession. One or more intermediate separator stages may, in certain embodiments, be arranged between and fluidically connected to the first separator stage and the last separator stage. Any appropriate number of intermediate separator stages may be present between the first separator stage and the last separator stage. For example, in some embodiments, the system comprises at least 1, at least 2, at least 3, at least 4, at least 5, at least 10, at least 20, at least 30, at least 40, or more (and/or up to 50, up to 100, up to 500, up to 1000, or more) intermediate separator stages.

FIGS. 1-2 are schematic illustrations of non-limiting embodiments of liquid-liquid chromatographic separator systems comprising a plurality of separator stages.

As shown in FIG. 1, liquid-liquid chromatographic separator system 100*a* comprises three separator stages (120, 140, and 160) fluidically connected in succession. While FIG. 1 shows three separator stages present, additional separator stages can also be present (indicated by the broken lines shown in streams 124*a*, 144*a*, 146*a*, and 166*a*, described in more detail below).

The three separator stages may be arranged in series with one another from first separator stage 120 to last separator stage 160, with intermediate separator stage 140 positioned between first separator stage 120 and last separator stage 160. First separator stage 120 may be fluidically connected to intermediate separator stage 140, which may be fluidically connected to last separator stage 160. For example, as shown in FIG. 1, stage 120 is fluidically connected, in series, to stage 140 via streams 124*a* and 148*a*. Stages 120 and 140 are also fluidically connected in series via streams 146*a* and 128*a*. Also as shown in FIG. 1, stage 140 is fluidically connected, in series, to stage 160 via streams 144*a* and 168*a*. Stages 140 and 160 are also fluidically connected in series via streams 166*a* and 148*a*.

While FIG. 1 shows a single intermediate separator stage between the first separator stage and the last separator stage, it should be understood that not all embodiments described herein are so limiting, and in other embodiments, additional intermediate separator stages may present between the first separator stage and the last separator stage. For example, as shown in FIG. 2, additional separator stage(s) (e.g., first additional separator stage 130) may be present between first separator stage 120 and intermediate separator stage 140 and/or additional separator stage(s) (e.g., second additional intermediate separator stage 150) may present between intermediate separator stage 140 and last separator stage 160. It should be understood that additional separator stages may also be present between any of the above-referenced intermediate separator stages illustrated in FIGS. 1-2.

It should be understood that fluidic connectivity between the various separator stages (e.g., between first separator stage 120 and intermediate separator stage 140, between intermediate separator stage 140 and last separator stage 160, etc.) and/or between fluid sources and separator stages illustrated in FIG. 1 may be either a direct fluidic connectivity or an indirect fluidic connectivity. As used herein, "direct fluidic connectivity" between a first stage and a second stage is said to exist when a stream passes from the first stage to the second stage without passing through another stage. Similarly, "direct fluidic connectivity" between a source and a stage is said to exist when a stream passes from the source to the stage without passing through another stage. Also, as used herein, "indirect fluidic connectivity" between a first stage and a second stage is said to exist when a stream passes from the first stage to the second stage but first passes through another stage. Similarly, as used herein, "indirect fluidic connectivity" between a source and a stage is said to exist when a stream passes from the source to the stage but first passes through another stage. To illustrate, referring to the fluidic connectivity between intermediate separator stage 140 and first separator stage 120, in embodiments in which no additional intermediate separator stages are present between intermediate separator stage 140 and first separator stage 120, the fluidic connectivity between intermediate separator stage 140 and first separator stage 120 is direct (and the two stages are said to be directly fluidically connected to each other). For example, as shown in FIG. 1, when the fluidic connectivity is a direct fluidic connectivity, a liquid (e.g., liquid 124*a*) exiting first separator stage 120 may be directly passed to intermediate separator stage 140 without first passing through another separator stage. Conversely, in embodiments in which one or more additional intermediate separator stages are present between first separator stage 120 and intermediate separator stage 140 such that stream 124*a* first passes through the additional intermediate stage before being transported from stage 120 to stage 140, the fluidic connectivity between intermediate separator stage 140 and first separator stage 120 via stream 124*a* is an indirect fluidic connectivity. A non-limiting example of such an indirect fluidic connectivity is illustrated in FIG. 2. As shown in FIG. 2, the fluidic connectivities between first separator stage 120 and intermediate separator stage 140 (via both the pathway that includes streams 124*a*, 138*a*, 134*a*, and 148*a* as well as the pathway that includes streams 146*a*, 138*a*, 136*a*, and 128*a*) are both indirect because each of these pathways includes stage 130 between stage 120 and stage 140.

While FIGS. 1-2 illustrate non-limiting embodiments of a liquid-liquid chromatographic separator system comprising more than two separator stages (e.g., three or more stages, five or more stages), it should be understood that not all embodiments described herein are so limiting, and in other embodiments, the liquid-liquid chromatographic separator system may also be a two-stage separator system, e.g., such as comprising solely a first separator stage and a last separator stage, without any intermediate separator stages in between.

In some embodiments, the liquid-liquid chromatographic separator system comprises a feed liquid inlet configured to receive a feed liquid stream. The feed liquid stream, in certain embodiments, comprises a mixture of a first solute and a second solute. The feed liquid stream may optionally comprise a liquid carrier in which the first solute and the second solute are suspended and/or solubilized. FIGS. 1-2 illustrate non-limiting examples of one such set of embodiments. As shown in FIGS. 1-2, liquid-liquid chromatographic separator systems 100*a* and 100*b* comprise feed liquid inlet 112. Feed liquid inlet 112 may be configured to receive feed liquid stream 112*a* comprising a first solute and a second solute. In accordance with certain embodiments, as discussed in more detail below, the first solute may have a higher affinity for a first liquid phase than the second solute, while the second solute may have a higher affinity for a second liquid phase distinct from (e.g., immiscible with) the first liquid phase than the first solute. Additionally or alternatively, in certain embodiments, the first liquid phase may have a higher affinity for a first solute than the second liquid phase, while the second liquid phase may have a higher affinity for a second solute than the first liquid phase.

The feed liquid inlet may be present in any of a variety of appropriate locations in the liquid-liquid chromatographic separator system. For example, in one set of embodiments, the feed liquid inlet may be positioned such that feed liquid stream feeds into one of the one or more intermediate separator stages before passing through the first separator stage or the last separator stage. For example, as shown in FIGS. 1-2, feed liquid inlet 112 may be positioned such feed liquid stream 112*a* feeds into intermediate separator stage 140 before passing through first separator stage 120 or last separator stage 160.

While FIG. 1 illustrates a non-limiting embodiment of a feed liquid inlet positioned such that feed liquid stream feeds directly into a particular intermediate separator stage (e.g., intermediate separator stage 140), it should be understood that not all embodiments described herein are so limiting, and in other embodiments, the feed liquid inlet may be positioned such that the feed liquid stream feeds into any intermediate separator stage(s) (e.g., such as additional intermediate separator stage 130 and 150 shown in FIG. 2).

In some embodiments, the liquid-liquid chromatographic separator system is fluidically connected to sources containing two or more distinct liquid phases, e.g., a source containing a first liquid phase and a source containing a second liquid phase. The first liquid phase and the second liquid phase may be, in some embodiments, immiscible with each other. The two or more distinct liquid phases may have a low mutual solubility with each other. For example, in some embodiments, the two or more distinct liquid phases have a mutual solubility of less than or equal to 200 mg/mL, less than or equal to 10 mg/mL, less than or equal to 1 mg/mL, less than or equal to 0.1 mg/mL, less than or equal to 0.001 mg/mL, less than or equal to 0.0001 mg/mL, or less than or equal to 0.00001 mg/mL (and/or, as little as 0.000001 mg/mL, as little as 0.0000001 mg/mL, or less) at the temperature at which the separation process is carried out. In some embodiments, the two or more distinct liquid phases have a mutual solubility of less than or equal to 200 mg/mL, less than or equal to 10 mg/mL, less than or equal to 1 mg/mL, less than or equal to 0.1 mg/mL, less than or equal to 0.001 mg/mL, less than or equal to mg/mL, or less than or equal to 0.00001 mg/mL (and/or, as little as 0.000001 mg/mL, as little as 0.0000001 mg/mL, or less) at 20° C. In some embodiments, the first liquid phase and the second liquid phase have mutual solubilities falling within any of the ranges outlined above.

FIGS. 1-2 illustrate non-limiting examples of one such set of embodiments. As shown in FIGS. 1-2, each of liquid-liquid chromatographic separator systems 100*a* and 100*b* is fluidically connected to source 114 containing a first liquid phase and source 116 containing a second liquid phase distinct from (e.g., immiscible with) the first liquid phase.

In some embodiments, a source containing the first liquid phase may be fluidically connected to (e.g., directly fluidically connected to) a first liquid inlet of the first separator stage, and a source containing the second liquid phase may be fluidically connected to (e.g., directly fluidically connected to) a last liquid inlet of the last separator stage. The first liquid inlet, in certain embodiments, is configured to receive a first liquid phase from a source containing the first liquid phase, while the last liquid inlet is configured to receive a second liquid phase that is distinct from (e.g., immiscible with) the first liquid phase from the source containing the second liquid phase. FIGS. 1-2 illustrate non-limiting examples of one such set of embodiments. As shown in FIGS. 1-2, source 114 containing the first liquid phase is fluidically connected to first liquid inlet 122 of first separator stage 120, such that first liquid inlet 122 is configured to receive first liquid phase 114*a* from source 114. Additionally, in FIGS. 1-2, source 116 containing the second liquid phase is fluidically connected to last liquid inlet 162 of last separator stage 160, such that last liquid inlet 162 is configured to receive second liquid phase 116*a* from source 116.

In some embodiments, each of the first liquid phase and the second liquid phase may have different affinities for the first solute from the feed liquid stream and the second solute from the feed liquid stream. For example, in certain embodiments, compared to the second liquid phase, the first liquid phase may have a higher affinity for (e.g., a higher solubility for) the first solute than for the second solute, e.g., such that the first solute has the ability to preferentially associate with the first liquid phase. Conversely, compared to the first liquid phase, the second liquid phase may have a higher affinity for (e.g., a higher solubility for) the second solute than for the first solute, e.g., such that the second solute has the ability to preferentially associate with the second liquid phase. As described in more detail below, the preferential association of the solutes with their respective liquid phases (e.g., the first solute with the first liquid phase, the second solute with the second liquid phase) may be related to the ability of the solute to selectively partition into the different liquid phases. The first solute and the second solute may have any of a variety of partition coefficients relative to the first and second liquid phases, as described in more detail below and elsewhere herein.

In some embodiments, each of the plurality of separator stages within the liquid-liquid chromatographic separator system comprises a liquid inlet and two liquid outlets. For example, each of the first separator stage, last separator stage, and the one or more intermediate separator stage(s) may comprise a liquid inlet and two liquid outlets. As described in more detail below, each separator stage may be configured to receive a mixed liquid stream comprising the two distinct liquid phases (e.g., the first liquid phase and the second liquid phase) and two solutes (e.g., the first solute and the second solute from the feed liquid stream) via the liquid inlet. The separator stage may be configured to separate the mixed liquid stream into two liquids, e.g., one comprising predominantly the first liquid phase having a mole fraction of the first solute relative to the sum of the first solute and the second solute that is larger than a mole fraction of the first solute relative to the sum of the first solute and the second solute in the mixed liquid stream received by the separator stage, and the other comprising predominantly the second liquid phase having a mole fraction of the second solute relative to the sum of the first solute and the second solute that is larger than a mole fraction of the second solute relative to the sum of the first solute and the second solute in the mixed liquid stream received by the separator stage, and output the two liquids via the two liquid outlets.

Any of a variety of suitable separation devices and/or components may be employed in the separator stage to separate the two liquid phases. For example, in one set of embodiments, at least one of the plurality of separator stages comprises a porous medium-based fluidic separator (e.g., a membrane-based separator). As described in more detail below, the porous medium-based separator may be employed to separate a mixed liquid stream comprising two liquid phases into two separated liquids (e.g., two separated liquid streams) based on a polarity difference between the two liquid phases. Additional examples of suitable separation devices are described in more detail below.

As used herein, something (e.g., a liquid, a stream, a container, etc.) is said to "predominantly" contain a first liquid phase if the first liquid phase makes up at least wt % (or, in some embodiments, at least 95 wt %, at least 98 wt %, at least 99 wt %, at least 99.5 wt %, at least 99.9 wt %, at least 99.99 wt %, or at least 99.999 wt % (and/or, up to 99.99999 wt %, or up to 100 wt %) of the total mass of the first liquid phase and the second liquid phase. Combinations of the above-referenced ranges are possible (e.g., at least 90 wt % and up to 100 wt. %). Other ranges are also possible.

Similarly, as used herein, something (e.g., a liquid, a stream, a container, etc.) is said to "predominantly" contain a second liquid phase if the second liquid phase makes up at least 90 wt % (or, in some embodiments, at least 95 wt %, at least 98 wt %, at least 99 wt %, at least 99.5 wt %, at least 99.9 wt %, at least 99.99 wt %, or at least 99.999 wt % (and/or, up to 99.99999 wt %, or up to 100 wt %) of the total mass of the first liquid phase and the second liquid phase. Combinations of the above-referenced ranges are possible (e.g., at least 90 wt % and up to 100 wt. %). Other ranges are also possible.

FIGS. 1-2 illustrate non-limiting examples of embodiments in which separator stages take in a mixture of liquid phases and produce two separated liquid streams. For example, as shown in FIG. 1, in liquid-liquid chromatographic separator system 100*a*, each of the plurality of separator stages (e.g., first separator stage 120, intermediate separator stage 140, last separator stage 160, etc.) comprises a liquid inlet and two liquid outlets. In FIGS. 1-2, each of the separator stages may be configured to receive a mixed liquid stream (e.g., mixed liquid stream 128*a* into stage 120, mixed liquid stream 148*a* into stage 140, and mixed liquid stream 168*a* into stage 160) comprising two distinct liquid phases (e.g., the first liquid phase and the second liquid phase) and two solutes (e.g., the first solute and the second solute) via the liquid inlet (e.g., via inlet 122, 142, and 162, respectively). The mixed liquid streams are indicated by dashed lines in FIGS. 1-2. In FIGS. 1-2, each of the separator stages can be configured to separate the two liquid phases from each other into two separate streams, and output the two streams via the two liquid outlets (e.g., outlets 124 and 126 in stage 120, outlets 144 and 146 in stage 140, and outlets 164 and 166 in stage 160). In FIGS. 1-2, each of the separator stages (e.g., separator stages 120, 140, 160) may output a liquid (e.g., liquid 126*a*, 146*a*, 166*a*) comprising predominantly the second liquid phase (with little, if any, of the first liquid phase) via one liquid outlet (e.g., outlet 126, 146, 166). In FIGS. 1-2, the streams that contain predominantly the second liquid phase are shown in dotted lines. In FIGS. 1-2, each of the separator stages (e.g., separator stages 120, 140, 160) may output another liquid (e.g., liquid 124*a*, 144*a*, 164*a*) comprising predominantly the first liquid phase (with little, if any, of the second liquid phase) via another liquid outlet (e.g., outlet 124, 144, 164). In FIGS. 1-2, the streams that contain predominantly the first liquid phase are shown in solid lines.

In embodiments in which the liquid-liquid chromatographic separator system comprises additional separator stages (e.g., such as first additional intermediate separator stage 130, second additional intermediate separator stage 150, etc., as shown in FIG. 2), each of the additional separator stages may have a similar or identical structure and/or components as the separator stages described above, e.g., such as having a liquid inlet and two liquid outlets, etc. For example, each of the additional intermediate separator stages (e.g., separator stage 130, 150, etc.) may be configured to receive a mixed liquid stream (e.g., mixed liquid stream 138*a* for stage 130 and mixed liquid stream 158*a* for stage 150) comprising two distinct liquid phases (e.g., a first liquid phase and a second liquid phase) via the respective liquid inlet (e.g., inlet 132 for stage 130 and inlet 152 for stage 150). In FIG. 2, each of the additional intermediate separator stages may separate the two distinct liquid phases from each other into two liquid streams, and output the two liquid streams via the two liquid outlets (e.g., outlets 134 and 136 for stage 130, and outlets 154 and 156 for stage 150, etc.). Each of the additional intermediate separator stages may output a liquid (e.g., liquid 136*a* or 156*a*) that comprises predominantly the second liquid phase (with little, if any, of the first liquid phase) via one liquid outlet (e.g., outlet 136 or 156), and output another liquid (e.g., liquid 134*a* or 154*a*) that comprises predominantly the first liquid phase (with little, if any, of the second liquid phase) via another liquid outlet (e.g., outlet 134 or 154).

Specifics of each of the separator stages and the associated inlets and outlets shown in FIGS. 1-2 are described in more detail below.

In some embodiments, the first separator stage comprises a first liquid inlet. The first liquid inlet, in certain embodiments, may be configured to receive liquid comprising at least a portion of the first solute from the feed liquid stream and at least a portion of the second solute from the feed liquid stream. As described in more detail below, the liquid comprising at least a portion of the first solute and at least a portion of the second solute received by the first liquid inlet may be a mixed liquid stream comprising a first liquid phase and a second liquid phase distinct from the first liquid phase. FIGS. 1-2 illustrate examples of one such set of embodiments. As shown in FIGS. 1-2, first separator stage 120 comprises first liquid inlet 122 configured to receive liquid 128*a* comprising at least a portion of the first solute from feed liquid stream 112*a* and at least a portion of the second solute from feed liquid stream 112*a*. Liquid 128*a* comprising at least a portion of the first solute and at least a portion of the second solute received by first liquid inlet 122 may be a mixed liquid stream comprising a first liquid phase and a second liquid phase distinct from the first liquid phase.

As used herein, the phrase "at least a portion" (e.g., whether referring to a liquid, a stream, a solute, or any other item) means some or all. In some embodiments, "at least a portion" of an item (e.g., a liquid, a stream, a solute, etc.) means at least 0.01 wt. %, at least 0.05 wt. %, at least 0.1 wt. %, at least 0.5 wt. %, at least 1 wt. %, at least 5 wt. %, at least 10 wt. %, at least 20 wt. %, at least 30 wt. %, at least 40 wt. %, at least 50 wt. %, at least 60 wt. %, at least 70 wt. %, at least 80 wt. %, at least 90 wt. %, at least 95 wt. %, at least 99 wt. %, at least 99.9 wt. %, or up to 100 wt. %.

For example, in some embodiments, a liquid comprising "at least a portion" of the first solute from the feed liquid stream contains at least 0.01 wt. %, at least 0.05 wt. %, at least 0.1 wt. %, at least 0.5 wt. %, at least 1 wt. %, at least 5 wt. %, at least 10 wt. %, at least 20 wt. %, at least 30 wt. %, at least 40 wt. %, at least 50 wt. %, at least 60 wt. %, at least 70 wt. %, at least 80 wt. %, at least 90 wt. %, at least 95 wt. %, at least 99 wt. %, at least 99.9 wt. %, or up to 100 wt. % of the first solute from the feed liquid stream. As another example, in some embodiments, a liquid comprising "at least a portion" of the second solute from the feed liquid stream contains at least 0.01 wt. %, at least 0.05 wt. %, at least 0.1 wt. %, at least 0.5 wt. %, at least 1 wt. %, at least 5 wt. %, at least 10 wt. %, at least 20 wt. %, at least 30 wt. %, at least 40 wt. %, at least 50 wt. %, at least 60 wt. %, at least 70 wt. %, at least 80 wt. %, at least 90 wt. %, at least 95 wt. %, at least 99 wt. %, at least 99.9 wt. %, or up to 100 wt. % of the second solute from the feed liquid stream.

In some embodiments, the first liquid inlet of the first stage is fluidically connected to a source containing a first liquid phase and to a liquid outlet of at least one of the one or more intermediate separator stage(s). The first liquid inlet, in some embodiments, may be configured to receive the first liquid phase from the source containing the first liquid phase and at least a portion of a liquid from the liquid outlet of the at least one intermediate separator stage. FIG. 1 illustrates an example of one such set of embodiments. As shown in FIG. 1, first liquid inlet 122 of first separator stage 120 is fluidically connected to source 114 containing the first liquid phase and fluidically connected to liquid outlet 146 of intermediate separator stage 140. In some instances, first liquid inlet 122 may be configured to receive first liquid phase 114*a* from source 114 containing the first liquid phase and at least a portion of liquid 146*a* from liquid outlet 146 of intermediate separator stage 140.

In FIG. 1, the fluidic connectivity between first liquid inlet 122 and intermediate liquid outlet 146 may be either a direct fluidic connectivity or an indirect fluidic connectivity. For example, in embodiments in which no additional intermediate separator stages are present between intermediate separator stage 140 and first separator stage 120, first liquid inlet 122 is in direct fluidic connectivity with liquid outlet 146 of intermediate separator stage 140. In some such embodiments, first liquid inlet 122 may be configured to receive all of liquid 146*a* from liquid outlet 146 of intermediate separator stage 140. On the contrary, as shown in FIG. 2, in embodiments in which one or more additional intermediate separator stages (e.g., first intermediate separator stage 130) are present between intermediate separator stage 140 and first separator stage 120, first liquid inlet 122 is in indirect fluidic connectivity with liquid outlet 146 of intermediate separator stage 140. As such, first liquid inlet 122 may be configured to receive only a portion of liquid 146*a* from liquid outlet 146 of intermediate separator stage 140 after liquid 146*a* has passed through the one or more additional intermediate separator stage(s). Depending on whether any additional intermediate separator stages are present and/or the number of additional intermediate separator stages between intermediate separator stage 140 and first separator stage 120, first liquid inlet 122 may be configured to receive at least 0.01 wt. % (e.g., at least 0.05 wt. %, at least 0.1 wt. %, at least 0.5 wt. %, at least 1 wt. %, at least 5 wt. %, at least 10 wt. %, at least 20 wt. %, at least wt. %, at least 40 wt. %) and/or up to 50 wt. % (e.g., up to 60 wt. %, up to 70 wt. %, up to 80 wt. %, up to 90 wt. % up to 95 wt. %, or 100 wt. %) of liquid 146*a* from liquid outlet 146 of intermediate separator stage 140.

In some embodiments, a mixing region may be fluidically connected to the first liquid inlet of the first separator stage. The mixing region, in certain embodiments, may be a region disposed along the fluidic connectivity between the first liquid inlet of the first separator stage and a liquid outlet of an intermediate separator stage. FIG. 1 illustrates an example of one such set of embodiments. As shown in FIG. 1, mixing region 128 may be fluidically connected to first liquid inlet 122 of first separator stage 120. In some cases, mixing region 128 may be disposed along the fluidic connectivity between first liquid inlet 122 of first separator stage 120 and liquid outlet 146 of intermediate separator stage 140.

In some embodiments, the mixing region fluidically connected to the first liquid inlet may be configured to combine and induce mixing between the first liquid phase from the source containing the first liquid phase and a liquid (e.g., a liquid comprising predominantly the second liquid phase) from a liquid outlet of the intermediate separator stage, thereby forming a mixed liquid stream comprising two liquid phases (e.g., the first liquid phase and the second liquid phase). The mixed liquid stream received by the first liquid inlet may comprise any appropriate composition and/or component described elsewhere herein, e.g., such as comprising at least a portion of the first solute from the feed liquid stream and at least a portion of the second solute from the feed liquid stream.

The mixing region, by inducing mixing, may facilitate preferential association or partitioning of the first solute and the second solute into the liquid phases (e.g., the first liquid phase, the second liquid phase) within the mixed liquid stream. For example, in one set of embodiments, the mixing region may be configured to facilitate preferential association of the first solute with the first liquid phase and preferential association of the second solute with the second liquid phase.

FIG. 1 illustrates an example of one such set of embodiments. As shown in FIG. 1, mixing region 128 may be configured to combine and induce mixing between first liquid phase 114*a* from source 114 and liquid 146*a* from liquid outlet 146 of intermediate separator stage 140, thereby forming mixed liquid stream 128*a* comprising two liquid phases, e.g., the first liquid phase and the second liquid phase. Mixed liquid stream 128*a* may comprise least a portion of the first solute from feed liquid stream 112*a* and at least a portion of the second solute from feed liquid stream 112*a*. By inducing mixing, mixing region 128 may facilitate preferential association or partitioning of the first solute and the second solute into the liquid phases (e.g., the first liquid phase, the second liquid phase) within mixed liquid stream 128*a*.

In some embodiments, the mixing region may be a part of any of a variety of mixing devices and/or systems. Non-limiting examples mixing devices and/or systems include channel junctions, vessels, static mixers, and stirrers.

As described in more detail below, the amount of the first solute and the second solute in each of the first liquid phase and the second liquid phase within the mixed liquid stream may depend on the partition coefficients of the solutes between the liquid phases, which is a measure of the ability of first solute and second solute to differentially partition between the first liquid phase and the second liquid phase. The first solute and/or the second solute may have any of a variety of appropriate partition coefficients, as described in more detail below.

The mixed liquid stream received by the first liquid inlet may comprise the first liquid phase and the second liquid phase in any of a variety of appropriate amounts. For example, in some embodiments, a mass ratio of the first liquid phase to the second liquid phase in the mixed liquid stream may be greater than or equal to 5:95, greater than or equal to 10:90, greater than or equal to 20:80, greater than or equal to 30:70, greater than or equal to 40:60, greater than or equal to 50:50, greater than or equal to 60:40, greater than or equal to 70:30, greater than or equal to 80:20, or greater than or equal to 90:10. In some embodiments, a mass ratio of the first liquid phase to the second liquid phase in the mixed liquid stream may be less than or equal to 95:5, less than or equal to 90:10, less than or equal to 80:20, less than or equal to 70:30, less than or equal to 60:40, less than or equal to 50:50, less than or equal to 40:60, less than or equal to 30:70, less than or equal to 20:80, or less than or equal to 10:90. Combinations of the above-referenced ranges are also possible (e.g., greater than or equal to 5:95 and less than or equal to 95:5). Other ranges are also possible. As would be understood by one of ordinary skill in the art, when a mass ratio of A:B is "greater than or equal to 10:90," it means that, when the mass of component A that is present is divided by the mass of component B that is present, the resulting value is greater than or equal to $^{10}/_{90}$ (i.e., greater than or equal to 0.111 repeating). Similarly, when a mass ratio of A:B is "less than or equal to 90:10," it that means that, when the mass of component A that is present is divided by the mass of component B that is present, the resulting value is less than or equal to $^{90}/_{10}$ (i.e., less than or equal to 9).

In some embodiments, the first separator stage comprises a liquid outlet configured to output a liquid having a mole fraction of the second solute relative to the sum of the first solute and the second solute that is larger than a mole fraction of the second solute relative to the sum of the first solute and the second solute in the feed liquid stream. FIGS. 1-2 illustrate examples of one such set of embodiments. As shown in FIGS. 1-2, first separator stage 120 comprises liquid outlet 126 configured to output liquid **126*a* having a mole fraction of the second solute relative to the sum of the first solute and the second solute that is larger than a mole fraction of the second solute relative to the sum of the first solute and the second solute in feed liquid stream 112*a*. In some embodiments, the mole fraction of the second solute relative to the sum of the first solute and the second solute in the liquid (e.g., liquid 126*a* in FIGS. 1-2) enriched in the second solute relative to the feed liquid stream that is output by the liquid outlet of the first separator stage may be at least 1.01 times, at least 1.05 times, at least 1.1 times, at least 1.2 times, at least 1.5 times, at least 2 times, at least 3 times, at least 5 times, at least times, at least 50 times, at least 100 times, at least 1000 times, or at least $10^5$ times (and/or up to $10^6$ times, up to $10^7$ times, up to $10^8$ times, or more) the mole fraction of the second solute relative to the total amount of the first solute and the second solute in the feed liquid stream (e.g., feed liquid stream 112*a* in FIGS. 1-2). Combination of the above-referenced ranges are possible (at least 1.01 times and up to $10^8$ times). Other ranges are also possible. As a non-limiting example, in some cases, the feed liquid stream (e.g., feed liquid stream 112*a*) may contain 50 mol of the first solute and 50 mol of the second solute, which means the mole fraction of the second solute relative to the total amount of the first solute and the second solute would be 0.5 (i.e., $^{50}/_{100}$). The output liquid (e.g., liquid 126*a*) from the liquid outlet of the first separator stage may contain 5 mol of the first solute and 45 mol of the second solute, which means the mole fraction of the second solute relative to the total amount of the first solute and the second solute in the liquid (e.g., liquid 126*a*) would be 0.9 (i.e., $^{45}/_{50}$). In this non-limiting example, the mole fraction of the second solute relative to the total amount of the first solute and the second solute in the output liquid is 1.8 times the mole fraction of the second solute relative to the total amount of the first solute and the second solute in the feed liquid stream (because 0.9 divided by 0.5 is 1.8). In this example, the output liquid would be said to be enriched in the second solute relative to the feed liquid stream because the mole fraction of the second solute relative to the total amount of the first solute and the second solute in the output liquid (e.g., liquid 126*a*) is higher than the mole fraction of the second solute relative to total amount of the first solute and the second solute in the feed liquid stream. As another non-limiting example, in some cases, the feed liquid stream may contain 50 mol of the first solute and 50 mol of the second solute, which means the mole fraction of the second solute relative to the total amount of the first solute and the second solute would be 0.5 (i.e., $^{50}/_{100}$). The output liquid (e.g., liquid 126*a*) from the liquid outlet of the first separator stage may contain 45 mol of the first solute and 5 mol of the second solute, which means the mole fraction of the second solute relative to the total amount of the first solute and the second solute in the output liquid (e.g., liquid 126*a*) would be 0.1 (.e., $^{5}/_{50}$). In this non-limiting example, the mole fraction of the second solute relative to the total amount of the first solute and the second solute in the output liquid (e.g., liquid 126*a*) is 0.2 times the mole fraction of the second solute relative to the total amount of the first solute and the second solute in the feed liquid stream (because 0.1 divided by 0.5 is 0.2). In this example, the output liquid (e.g., liquid 126*a*) would not be said to be enriched in the second solute relative to the feed liquid stream because the mole fraction of the second solute relative to the total amount of the first solute and the second solute in the output liquid (e.g., liquid 126*a***) is lower than the mole fraction of the second solute relative to the total amount of the first solute and the second solute in the feed liquid stream.

In accordance with certain embodiments, a liquid output from a liquid outlet of the first separator stage has a mole fraction of the second solute relative to the sum of the first solute and the second solute that is larger than a mole fraction of the second solute relative to the sum of the first solute and the second solute in the liquid (e.g., a mixed liquid stream) received by the first liquid inlet of the first separator stage. As shown in FIGS. 1-2, liquid **126*a* output from liquid outlet 126 of first separator stage 120 may have a mole fraction of the second solute relative to the sum of the first solute and the second solute that is larger than a mole fraction of the second solute relative to the sum of the first solute and the second solute in liquid 128*a* (e.g., a mixed liquid stream) received by first liquid inlet 122 of first separator stage 120. In some embodiments, the mole fraction of the second solute relative to the total amount of the first solute and the second solute in the liquid (e.g., liquid 126*a* in FIGS. 1-2**) output from a liquid outlet of the first separator stage may be at least 1.01 times, at least 1.05 times, at least 1.1 times, at least 1.2 times, at least 1.5 times, at least 2 times, at least 3 times, at least 5 times, at least 10 times, at least 50 times, at least 100 times, or at least 500 times, (and/or up to $10^3$ times, or more) the mole fraction of the second solute relative to the total amount of the first solute and the second solute in the liquid (e.g., liquid 128*a* in FIGS. 1-2) received by the first stage inlet of the first separator stage. Combination of the above-referenced ranges are possible (at least 1.01 times and up to $10^3$ times). Other ranges are also possible.

In some embodiments, the second solute makes up a relatively high percentage of a total amount of the first solute and the second solute contained within the liquid (e.g., liquid 126*a* in FIGS. 1-2) that is output from the liquid outlet (e.g., liquid outlet 126) of the first separator stage (e.g., first separator stage 124). For example, in some embodiments, the second solute makes up at least 80 wt. % (e.g., at least 85 wt. %, at least wt. %, at least 95 wt. %, at least 97 wt. %, at least 98 wt. %, at least 99 wt. %, at least 99.5 wt. %, at least 99.9 wt. %) and/or up to 99.99 wt. % (e.g., up to 100 wt. %) of the total amount of the first solute and the second solute contained within liquid 126*a* that is output by liquid outlet 126 of first separator stage 120. Combinations of the above-referenced ranges are possible (e.g., at least 80 wt. % and up to 100 wt. %). Other ranges are also possible. In one set of embodiments, the liquid output comprises a negligible amount, if any, of the first solute (e.g., such that second solute makes up 100 wt. % of total amount of solutes).

In some embodiments, the liquid having a mole fraction of the second solute relative to the sum of the first solute and the second solute that is larger than a mole fraction of the second solute relative to the sum of the first solute and the second solute in the feed liquid stream that is output from the liquid outlet of the first separator stage comprises predominantly the second liquid phase and a small amount, if any, of the first liquid phase. For example, as shown in FIGS. 1-2, liquid 126*a* having a mole fraction of the second solute relative to the sum of the first solute and the second solute that is larger than a mole fraction of the second solute relative to the sum of the first solute and the second solute in feed liquid stream 112*a* that is output from liquid outlet 126 of first separator stage 120 comprises predominantly the second liquid phase and a small amount, if any, of the first liquid phase.

In some embodiments, the first separator stage comprises a liquid outlet fluidically connected to an intermediate liquid inlet of at least one of the one or more intermediate separator stages. FIG. 1 illustrates an example of one such set of embodiments. As shown in FIG. 1, first separator stage 120 comprises liquid outlet 124 fluidically connected to intermediate liquid inlet 142 of intermediate separator stage 140. As described in more detail below, depending on whether additional separator stage(s) are present between first separator stage 120 and intermediate separator stage 140, liquid outlet 124 of first separator stage 120 may be either directly or indirectly fluidically connected to intermediate separator stage 140.

In some embodiments, the liquid outlet of the first separator stage fluidically connected to the intermediate liquid inlet of the intermediate separator stage is configured to output a liquid having a mole fraction of the first solute relative to the sum of the first solute and the second solute that is larger than a mole fraction of the first solute relative to the sum of the first solute and the second solute in the liquid received by the first liquid inlet of the first separator stage. As shown in FIG. 1, liquid outlet 124 of first separator stage 120, which is fluidically connected to intermediate liquid inlet 142 of intermediate separator stage 140, is configured to output liquid 124*a* having a mole fraction of the first solute relative to the sum of the first solute and the second solute that is larger than a mole fraction of the first solute relative to the sum of the first solute and the second solute in liquid 128*a* received by first liquid inlet 122 of first separator stage 120. In some embodiments, a mole fraction of the first solute relative to the total amount of the first solute and the second solute in liquid 124*a* may be at least 1.01 times, at least 1.05 times, at least 1.1 times, at least 1.2 times, at least 1.5 times, at least 2 times, at least 3 times, at least 5 times, at least 10 times, at least 50 times, at least 100 times, or at least 500 times (and/or up to $10^3$ times, or more) the mole fraction of the first solute relative to the total amount of the first solute and the second solute in liquid 128*a* received by first liquid inlet 122 of first separator stage 120. Combinations of the above-referenced ranges are possible (e.g., at least 1.01 times and up to $10^3$ times). Other ranges are also possible.

In some embodiments, the liquid having a mole fraction of the first solute relative to the sum of the first solute and the second solute that is larger than a mole fraction of the first solute relative to the sum of the first solute and the second solute in the liquid received by the first liquid inlet that is output by the liquid outlet of the first separator stage comprises predominantly the first liquid phase and a small amount, if any, of the second liquid phase. For example, as shown in FIGS. 1-2, liquid 124*a* having a mole fraction of the first solute relative to the sum of the first solute and the second solute that is larger than a mole fraction of the first solute relative to the sum of the first solute and the second solute in liquid 128*a* that is output by liquid outlet 124 of first separator stage 120 comprises predominantly the first liquid phase and a small amount, if any, of the second liquid phase.

In some embodiments, the liquid-liquid chromatographic separator system comprises one or more intermediate separator stages. In accordance with some embodiments, at least one of the one or more intermediate separator stages comprises an intermediate liquid inlet configured to receive liquid comprising at least a portion of the first solute from the feed liquid stream and at least a portion of the second solute from the feed liquid stream. FIGS. 1-2 illustrate examples of one such set of embodiments. As shown in FIGS. 1-2, intermediate separator stage 140 comprises intermediate liquid inlet 142 configured to receive liquid 148*a* comprising at least a portion of the first solute from feed liquid stream 112*a* and at least a portion of the second solute from feed liquid stream 112*a*. In some embodiments, the liquid comprising at least a portion of the first solute and at least a portion of the second solute received by the intermediate liquid inlet is a mixed liquid stream comprising a first liquid phase and a second liquid phase distinct from the first liquid phase. The first liquid phase and the second liquid phase may comprise any of a variety of appropriate first liquid phases and second liquid phase phases described elsewhere herein. Details regarding the composition of the mixed liquid stream are provided in more detail below.

In some embodiments, the intermediate liquid inlet of at least one of the intermediate separator stage(s) is fluidically connected to (e.g., directly or indirectly fluidically connected to) the feed liquid inlet, a liquid outlet of the first separator stage, and a liquid outlet of the last separator stage. FIG. 1 illustrates an example of one such set of embodiments. As shown in FIG. 1, intermediate liquid inlet 142 of intermediate separator stage 142 is directly fluidically connected to feed liquid inlet 112, fluidically connected to liquid outlet 124 of first separator stage 120 (directly or indirectly), and fluidically connected to liquid outlet 166 of last separator stage 160 (directly or indirectly).

In some embodiments, the intermediate liquid inlet may be configured to receive the feed liquid stream from the feed liquid inlet, at least a portion of the liquid from the liquid outlet of the first separator stage, and at least a portion of the liquid from the liquid outlet of the last separator stage. For example, as shown in FIG. 1, intermediate liquid inlet 142 may be configured to receive feed liquid stream 112*a* from feed liquid inlet 112, at least a portion of liquid 124*a* from liquid outlet 124 of first separator stage 120, and at least a portion of liquid 166*a* from liquid outlet 166 of last separator stage 160. The relative amount of liquid 124*a* received from liquid outlet 124 of first separator stage 120 and/or liquid 166*a* from liquid outlet 166 of last separator stage 160 may depend on the fluidic connectivity between the associated separator stages (e.g., whether the fluidic connectivity is a direct fluidic connectivity or indirect fluidic connectivity).

For example, referring to FIG. 1, the fluidic connectivity between intermediate liquid inlet 142 of intermediate separator stage 140 and liquid outlet 124 of first separator stage 120 may be either a direct fluidic connectivity or an indirect fluidic connectivity. For instance, in embodiments in which no additional intermediate separator stages are present between intermediate separator stage 140 and first separator stage 120, intermediate liquid inlet 142 is in direct fluidic connectivity with liquid outlet 124 of first separator stage 120. As such, in some such embodiments, intermediate liquid inlet 142 may be configured to receive all of liquid 124*a* from liquid outlet 124 of first separator stage 124. On the contrary, as shown in FIG. 2, in embodiments in which one or more additional intermediate separator stages (e.g., additional separator stage 130) are present between intermediate separator stage 140 and first separator stage 120, intermediate liquid inlet 142 is in indirect fluidic connectivity with liquid outlet 124 of first separator stage 120. In some such embodiments, intermediate liquid inlet 142 may be configured to receive at least a portion of liquid 124*a* from liquid outlet 124 of first separator stage 120 after liquid 124*a* passes through the one or more additional intermediate separator stage(s) (e.g., additional intermediate separator stage 130). Depending on whether any additional intermediate separator stages are present and/or the number of additional intermediate separator stages between intermediate separator stage 140 and first separator stage 120, intermediate liquid inlet 142 may be configured to receive at least at 0.01 wt. % (e.g., at least 0.05 wt. %, at least 0.1 wt. %, at least 0.5 wt. %, at least 1 wt. %, at least 5 wt. %, at least 10 wt. %, at least 20 wt. %, at least 30 wt. %, at least 40 wt. %) and/or up to 50 wt. % (e.g., up to 60 wt. %, up to 70 wt. %, up to 80 wt. %, up to 90 wt. % up to 95 wt. %, or 100 wt. %) of liquid 124*a* from liquid outlet 124 of first separator stage 120. Combinations of the above-referenced ranges are possible (e.g., at least 0.01 wt. % and up to 100 wt. %). Other ranges are also possible.

Similarly, as shown in FIG. 1, the fluidic connectivity between intermediate liquid inlet 142 of intermediate separator stage 140 and liquid outlet 166 of last separator stage 160 may be either a direct fluidic connectivity or an indirect fluidic connectivity. For instance, in embodiments in which no additional intermediate separator stages are present between intermediate separator stage 140 and last separator stage 160, intermediate liquid inlet 142 is in direct fluidic connectivity with liquid outlet 166 of last separator stage 160. As such, in some such embodiments, intermediate liquid inlet 142 may be configured to receive all of liquid 166*a* from liquid outlet 166 of last separator stage 160. On the contrary, as shown in FIG. 2, in embodiments in which one or more additional intermediate separator stages (e.g., additional separator stage 150) are present between in intermediate separator stage 140 and last separator stage 160, intermediate liquid inlet 142 is in indirect fluidic connectivity with liquid outlet 166 of last separator stage 160. As such, intermediate liquid inlet 142 may be configured to receive at least a portion of liquid 166*a* from liquid outlet 166 of last separator stage 160 after liquid 166*a* passes through one or more additional intermediate separator stage(s) (e.g., additional intermediate separator stage 150). Depending on whether any additional intermediate separator stages are present and/or the number of additional intermediate separator stages between intermediate separator stage 140 and last separator stage 160, intermediate liquid inlet 142 may be configured to receive at least 0.01 wt. % (e.g., at least 0.05 wt. %, at least 0.1 wt. %, at least 0.5 wt. %, at least 1 wt. %, at least 5 wt. %, at least 10 wt. %, at least 20 wt. %, at least 30 wt. %, at least 40 wt. %) and/or up to 50 wt. % (e.g., up to 60 wt. %, up to 70 wt. %, up to 80 wt. %, up to 90 wt. % up to 95 wt. %, or 100 wt. %) of liquid 166*a* from liquid outlet 166 of last separator stage 160. Combinations of the above-referenced ranges are possible (e.g., at least 0.01 wt. % and up to 100 wt. %). Other ranges are also possible.

In some embodiments, the liquid-liquid chromatographic separator system comprises one or more mixing regions fluidically connected to (e.g., directly fluidically connected to) the intermediate liquid inlet of at least one of the one or more intermediate separator stages. FIG. 1 illustrates an example of one such set of embodiments. As shown in FIG. 1, liquid-liquid chromatographic separator system 10*a* comprises mixing region 148 directly fluidically connected to intermediate liquid inlet 142 of intermediate separator stage 140.

In some embodiments, the mixing region fluidically connected to the intermediate liquid inlet may be configured to combine and induce mixing between at least a portion of a liquid (e.g., a liquid comprising predominately the first liquid phase) from a liquid outlet of the first separator stage and at least a portion of the liquid (e.g., a liquid comprising predominately the second liquid phase) from a liquid outlet of the last separator stage, thereby forming a mixed liquid stream comprising two liquid phases (e.g., the first liquid phase and the second liquid phase). The mixed stream, in certain embodiments, is further combined and mixed with the feed liquid stream at the feed liquid inlet. For example, as shown in FIG. 1, mixing region 148 fluidically connected to intermediate liquid inlet 142 may be configured to combine and induce mixing between at least a portion of liquid 124*a* from liquid outlet 124 of first separator stage 120 and at least a portion of liquid 166*a* from liquid outlet 166 of last separator stage 160, thereby forming a mixed liquid stream comprising two liquid phases (e.g., the first liquid phase and the second liquid phase). The mixed stream may be further combined and mixed with feed liquid stream 112*a* at feed liquid inlet 112, thereby forming mixed liquid stream 148*a*. While two separate mixing regions are shown in FIG. 1, it should be understood that, in other embodiments, all three streams can be mixed within the same mixing region. For example, in some embodiments, all three of streams 166*a*, 124*a*, and 112*a* can be mixed within the same mixing region.

While FIG. 1 illustrates a non-limiting embodiment of a feed liquid inlet in direct fluidic communication with a particular intermediate separator stage (e.g., intermediate separator stage 140), it should be understood that not all embodiments described herein are so limiting, and in other embodiments, the feed liquid inlet may be directly fluidically connected with another separator stage (e.g., additional separator stage(s), first separator stage, last separator stage). For example, referring to FIG. 2, feed liquid inlet 112, instead of being directly fluidically connected to separator stage 140, may be directly fluidically connected to any other separator stage (e.g., separator stages 120, 130, 150, or 160).

Also, while FIG. 1 illustrates a non-limiting embodiment of a feed liquid inlet in direct fluidic communication with a particular mixing region (e.g., mixing region 148), it should be understood that not all embodiments described herein are so limiting, and in other embodiments, the feed liquid inlet may be directly fluidically connected with another mixing region. For example, referring to FIG. 2, feed liquid inlet 112, instead of being directly fluidically connected to mixing region 148, may be directly fluidically connected to any other mixing region (e.g., mixing regions 128, 138, 158, or 168).

The mixing region associated with the intermediate liquid inlet may comprise and/or may be a part of any of a variety of mixing devices and/or systems, including any of those described elsewhere herein.

The mixed liquid stream (e.g., mixed liquid stream 148*a* in FIG. 1) received by the intermediate liquid inlet may comprise any appropriate composition and/or component described elsewhere herein, e.g., such as comprising at least a portion of the first solute from the feed liquid stream and at least a portion of the second solute from the feed liquid stream. The mixing region, by inducing mixing, may facilitate preferential association or partitioning of the first solute and the second solute into the liquid phases (e.g., the first liquid phase, the second liquid phase) within the mixed liquid stream. For example, in one set of embodiments, the mixing region fluidically connected to the intermediate of the intermediate separator stage may be configured to facilitate preferential association of the first solute with the first liquid phase and preferential association of the second solute with the second liquid phase within the mixed liquid stream. In some embodiments, the first liquid phase within the mixed liquid stream received by the intermediate liquid inlet may have a mole fraction of the first solute relative to the sum of the first and second solute that is larger than a mole fraction of the first solute relative to the sum of the first and second solute in the second liquid phase, and the second liquid phase within the mixed liquid stream received by the intermediate liquid inlet may have a mole fraction of the second solute relative to the sum of the first and second solute that is larger than a mole fraction of the second solute relative to the sum of the first and second solute in the first liquid phase.

The mixed liquid stream received by the intermediate liquid inlet may comprise the first liquid phase and the second liquid phase in any appropriate proportions. For example, in some embodiments, a mass ratio of the first liquid phase to the second liquid phase in the mixed liquid stream received by the intermediate liquid inlet may be greater than or equal to 5:95, greater than or equal to 10:90, greater than or equal to 20:80, greater than or equal to 30:70, greater than or equal to 40:60, greater than or equal to greater than or equal to 60:40, greater than or equal to 70:30, or greater than or equal to 80:20. In some embodiments, a mass ratio of the first liquid phase to the second liquid phase in the mixed liquid stream received by the intermediate liquid inlet may be less than or equal to 95:5, less than or equal to 90:10, less than or equal to 80:20, less than or equal to 70:30, less than or equal to 60:40, less than or equal to 50:50, less than or equal to 40:60, less than or equal to 30:70, or less than or equal to 20:80. Combinations of the above-referenced ranges are also possible (e.g., greater than or equal to 5:95 and less than or equal to 95:5). Other ranges are also possible.

In some embodiments, at least one of the one or more intermediate separator stages comprises an intermediate liquid outlet fluidically connected to a last liquid inlet of the last separator stage. FIG. 1 illustrates an example of one such set of embodiments. As shown in FIG. 1, intermediate separator stage 140 comprises intermediate liquid outlet 144 fluidically connected to last liquid inlet 162 of last separator stage 160. As described in more detail below, depending on whether additional separator stage(s) are present between intermediate separator stage 140 and last separator stage 160, liquid outlet 144 of intermediate separator stage 140 may be either directly or indirectly fluidically connected to last liquid inlet 162 of last separator stage 160.

In some embodiments, the intermediate liquid outlet fluidically connected to the last liquid inlet of the last separator stage is configured to output a liquid having a mole fraction of the first solute relative to the sum of the first solute and the second solute that is larger than a mole fraction of the first solute relative to the sum of the first solute and the second solute in the liquid received by the intermediate liquid inlet. FIG. 1 illustrates an example of one such set of embodiments. As shown in FIG. 1, liquid outlet 144 of intermediate separator stage 140, which is fluidically connected to last liquid inlet 162 of last separator stage 160, may be configured to output liquid 144*a* having a mole fraction of the first solute relative to the sum of the first solute and the second solute that is larger than a mole fraction of the first solute relative to the sum of the first solute and the second solute in liquid 148*a* received by intermediate liquid inlet 142. For example, in some embodiments, the mole fraction of the first solute relative to the total amount of the first solute and the second solute in liquid 144*a* may be may be at least 1.01 times, at least 1.05 times, at least 1.1 times, at least 1.2 times, at least 1.5 times, at least 2 times, at least 3 times, at least 5 times, at least 10 times, at least 50 times, at least 100 times, or at least 500 times (and/or up to $10^3$ times, or more) the mole fraction of the first solute relative to the total amount of the first solute and the second solute in liquid 148*a* received by intermediate liquid inlet 142 of intermediate separator stage 140. Combinations of the above-referenced ranges are possible (e.g., at least 1.01 times and up to $10^3$ times). Other ranges are also possible.

In some embodiments, the liquid having a mole fraction of the first solute relative to the sum of the first solute and the second solute that is larger than a mole fraction of the first solute relative to the sum of the first solute and the second solute in the liquid received by the intermediate liquid inlet that is output from the liquid outlet of the intermediate separator stage comprises predominantly the first liquid phase and a small amount, if any, of the second liquid phase. For example, as shown in FIGS. 1-2, liquid 144*a* having a mole fraction of the first solute relative to the sum of the first solute and the second solute that is larger than a mole fraction of the first solute relative to the sum of the first solute and the second solute in liquid 148*a* received by intermediate liquid inlet 142 comprises predominantly the first liquid phase as opposed to the second liquid phase.

In some embodiments, at least one of the one or more intermediate separator stages comprises an intermediate liquid outlet fluidically connected to the first liquid inlet of the first separator stage. FIG. 1 illustrates an example of one such set of embodiments. As shown in FIG. 1, intermediate separator stage 140 comprises intermediate liquid outlet 146 fluidically connected to first liquid inlet 122 of first separator stage 120. As described elsewhere herein, depending on whether additional separator stage(s) are present between intermediate separator stage 140 and first separator stage 120, liquid outlet 146 of intermediate separator stage 140 may be either directly or indirectly fluidically connected to first liquid inlet 122 of first separator stage 120.

In some embodiments, the intermediate liquid outlet fluidically connected to the first liquid inlet of the first separator stage is configured to output a liquid having a mole fraction of the second solute relative to the sum of the first solute and the second solute that is larger than a mole fraction of the second solute relative to the sum of the first solute and the second solute in the liquid received by the intermediate liquid inlet. FIG. 1 illustrates an example of one such set of embodiments. As shown in FIG. 1, liquid outlet 146 of intermediate separator stage 140, which is fluidically connected to first liquid inlet 122 of the first separator stage 120, is configured to output liquid 146*a* having a mole fraction of the second solute relative to the sum of the first solute and the second solute that is larger than a mole fraction of the second solute relative to the sum of the first solute and the second solute in liquid 148*a* received by intermediate liquid inlet 142. For example, in some embodiments, the mole fraction of the second solute relative to the total amount of the first solute and the second solute in liquid 146*a* may be at least 1.01 times, at least 1.05 times, at least 1.1 times, at least 1.2 times, at least 1.5 times, at least 2 times, at least 3 times, at least 5 times, at least 10 times, at least 50 times, at least 100 times, or at least 500 times (and/or up to $10^3$ times, or more) the mole fraction of the second solute relative to the total amount of the first solute and the second solute in liquid 148*a* received by intermediate liquid inlet 142 of intermediate separator stage 140. Combinations of the above-referenced ranges are possible (e.g., at least 1.01 times and up to $10^3$ times). Other ranges are also possible.

In some embodiments, the liquid having a mole fraction of the second solute relative to the sum of the first solute and the second solute that is larger than a mole fraction of the second solute relative to the sum of the first solute and the second solute in the liquid received by the intermediate liquid inlet that is output from the liquid outlet of the intermediate separator stage comprises predominantly the second liquid phase and a small amount, if any, of the first liquid phase. For example, as shown in FIGS. 1-2, liquid 146*a* having a mole fraction of the second solute relative to the sum of the first solute and the second solute that is larger than a mole fraction of the second solute relative to the sum of the first solute and the second solute in liquid 148*a* received by intermediate liquid inlet 142 comprises predominantly the second liquid phase and a small amount, if any, of the first liquid phase.

In some embodiments, the last separator stage comprises a last liquid inlet. The last liquid inlet, in certain embodiments, may be configured to receive liquid comprising at least a portion of the first solute from the feed liquid stream and at least a portion of the second solute from the feed liquid stream. As described in more detail below, the liquid comprising at least a portion of the first solute and at least a portion of the second solute received by the last liquid inlet is a mixed liquid stream comprising a first liquid phase and a second liquid phase distinct from the first liquid phase.

FIGS. 1-2 illustrate examples of one such set of embodiments. As shown in FIGS. 1-2, last separator stage 160 comprises last liquid inlet 162 configured to receive liquid 168*a* comprising at least a portion of the first solute from feed liquid stream 112*a* and at least a portion of the second solute from feed liquid stream 112*a*. Liquid stream 168*a* may be a mixed liquid stream comprising a first liquid phase and a second liquid phase distinct from (e.g., immiscible with) the first liquid phase. The first liquid phase and the second liquid phase may comprise any of a variety of appropriate first liquid phases and second liquid phase phases described elsewhere herein.

In some embodiments, the last liquid inlet is fluidically connected to (e.g., directly fluidically connected to) a source containing the second liquid phase and fluidically connected to (e.g., directly fluidically connected to) a liquid outlet of at least one of the one of the intermediate separator stage(s). The last liquid inlet, in some embodiments, may be configured to receive the second liquid phase from the source containing the second liquid phase and at least a portion of a liquid from the liquid outlet of the at least one intermediate separator stage. FIG. 1 illustrates an example of one such set of embodiments. As shown in FIG. 1, last liquid inlet 162 of last separator stage 160 is fluidically connected to source 116 containing the second liquid phase and fluidically connected to liquid outlet 144 of intermediate separator stage 140. In some instances, last liquid inlet 162 may be configured to receive second liquid phase 116*a* from source 116 containing the second liquid phase and at least a portion of liquid 144*a* from liquid outlet 144 of intermediate separator stage 140.

In FIG. 1, the fluidic connectivity between last liquid inlet 162 and intermediate liquid outlet 144 may be either a direct fluidic connectivity or an indirect fluidic connectivity. For example, in embodiments in which no additional intermediate separator stages are present between intermediate separator stage 140 and last separator stage 160, last liquid inlet 162 is in direct fluidic connectivity with liquid outlet 144 of intermediate separator stage 140. As such, in some such embodiments, last liquid inlet 162 may be configured to receive all of liquid 144*a* from liquid outlet 144 of intermediate separator stage 140. On the contrary, as shown in FIG. 2, in embodiments in which one or more additional intermediate separator stages (e.g., second intermediate separator stage 150) are present between intermediate separator stage 140 and last separator stage 160, last liquid inlet 162 is in indirect fluidic connectivity with liquid outlet 144 of intermediate separator stage 140. As such, last liquid inlet 162 may be configured to receive at least a portion of liquid 144*a* from liquid outlet 144 of intermediate separator stage 140 after liquid 144*a* passes through the one or more additional intermediate separator stage(s). Depending on whether any additional intermediate separator stages are present and/or the number of additional intermediate separator stages between intermediate separator stage 140 and last separator stage 160, last liquid inlet 162 may be configured to receive at least 0.01 wt. % (e.g., at least 0.05 wt. %, at least 0.1 wt. %, at least 0.5 wt. %, at least 1 wt. %, at least 5 wt. %, at least 10 wt. %, at least 20 wt. %, at least 30 wt. %, at least 40 wt. %) and/or up to 50 wt. % (e.g., up to 60 wt. %, up to 70 wt. %, up to 80 wt. %, up to 90 wt. % up to 95 wt. %, or 100 wt. %) of liquid 144*a* from liquid outlet 144 of intermediate separator stage 140.

In some embodiments, a mixing region may be fluidically connected to (e.g., directly fluidically connected to) the last liquid inlet of the last separator stage. The mixing region, in certain embodiments, may be a region disposed along the fluidic connectivity between the last liquid inlet of the last separator stage and a liquid outlet of the intermediate separator stage. FIG. 1 illustrates an example of one such set of embodiments. As shown in FIG. 1, mixing region 168 is directly fluidically connected to last liquid inlet 162 of last separator stage 160. In some cases, mixing region 168 may be disposed along the fluidic connectivity between last liquid inlet 162 of last separator stage 160 and liquid outlet 144 of intermediate separator stage 140.

In some embodiments, the mixing region fluidically connected to the last liquid inlet may be configured to combine and induce mixing between the second liquid phase from the source containing the second liquid phase and a liquid (e.g., a liquid comprising predominantly the first liquid phase as opposed to the second liquid phase) from a liquid outlet of an intermediate separator stage, thereby forming a mixed liquid stream comprising two liquid phases (e.g., the first liquid phase and the second liquid phase). The mixed liquid stream received by the last liquid inlet may comprise any appropriate composition and/or component described elsewhere herein, e.g., such as comprising at least a portion of the first solute from the feed liquid stream and at least a portion of the second solute from the feed liquid stream. The mixing region, by inducing mixing, may facilitate movement or partitioning of the first solute and the second solute into the liquid phases (e.g., the first liquid phase, the second liquid phase) within the mixed liquid stream. For example, in one set of embodiments, the mixing region may be configured to facilitate preferential association of the first solute with the first liquid phase and preferential association of the second solute with the second liquid phase.

FIG. 1 illustrates an example of one such set of embodiments. As shown in FIG. 1, mixing region 168 may be configured to combine and induce mixing between second liquid phase 116*a* from source 116 and liquid 144*a* from liquid outlet 144 of intermediate separator stage 140, thereby forming mixed liquid stream 168*a* comprising two liquid phases, e.g., the first liquid phase and the second liquid phase. Mixed liquid stream 168*a* may be configured to comprise least a portion of the first solute from feed liquid stream 112*a* and at least a portion of the second solute from feed liquid stream 112*a*. By inducing mixing, mixing region 168 may facilitate movement or partitioning of the first solute and the second solute into the liquid phases (e.g., the first liquid phase, the second liquid phase) within mixed liquid stream 168*a*.

The mixing region may comprise and/or may be a part of any of a variety of mixing devices and/or systems, including any of those described elsewhere herein.

The mixed liquid stream received by the last liquid inlet may comprise the first liquid phase and the second liquid phase in any appropriate proportions. For example, in some embodiments, a mass ratio of the first liquid phase to the second liquid phase in the mixed liquid stream received by the last liquid inlet may be greater than or equal to 5:95, greater than or equal to 10:90, greater than or equal to 20:80, greater than or equal to 30:70, greater than or equal to 40:60, greater than or equal to 50:50, greater than or equal to 60:40, greater than or equal to 70:30, or greater than or equal to 80:20. In some embodiments, a mass ratio of the first liquid phase to the second liquid phase in the mixed liquid stream may be less than or equal to 95:5, less than or equal to 90:10, less than or equal to 80:20, less than or equal to 70:30, less than or equal to 60:40, less than or equal to 50:50, less than or equal to 40:60, less than or equal to 30:70, or less than or equal to 20:80. Combinations of the above-referenced ranges are also possible (e.g., greater than or equal to 5:95 and less than or equal to 95:5). Other ranges are also possible.

The amount of the first solute and the second solute in each of the first liquid phase and the second liquid phase within the mixed liquid stream may depend on the partition coefficients of the solutes between the liquid phases, which is a measure of the ability of first solute and second solute to differentially partition between the first liquid phase and the second liquid phase. The first solute and/or the second solute may have any of a variety of appropriate partition coefficients, as described in more detail below.

In some embodiments, the last separator stage comprises a liquid outlet fluidically connected to an intermediate liquid inlet of at least one of the one or more intermediate separator stages. FIG. 1 illustrate an example of one such set of embodiments. As shown in FIG. 1, last separator stage 160 comprises liquid outlet 166 fluidically connected to intermediate liquid inlet 142 of intermediate separator stage 140. As described elsewhere herein, depending on whether additional separator stage(s) are present between last separator stage 160 and intermediate separator stage 140, liquid outlet 166 of last separator stage 160 may be either directly or indirectly fluidically connected to intermediate separator stage 140.

In some embodiments, the liquid outlet of the last separator stage fluidically connected to the intermediate liquid inlet of the intermediate separator stage is configured to output a liquid having a mole fraction of the second solute relative to the sum of the first solute and the second solute that is larger than a mole fraction of the second solute relative to the sum of the first solute and the second solute in the liquid received by the last liquid inlet of the last separator stage. As shown in FIG. 1, liquid outlet 166 of last separator stage 160, which is fluidically connected to intermediate liquid inlet 142, is configured to output liquid 166*a* having a mole fraction of the second solute relative to the sum of the first solute and the second solute that is larger than a mole fraction of the second solute relative to the sum of the first solute and the second solute in liquid 168*a* received by last liquid inlet 162 of last separator stage 160. In some embodiments, the mole fraction of the second solute relative to the total amount of the first solute and the second solute in liquid 166*a* may be at least 1.01 times, at least 1.05 times, at least 1.1 times, at least 1.2 times, at least 1.5 times, at least 2 times, at least 3 times, at least 5 times, at least 10 times, at least 50 times, at least 100 times, or at least 500 times (and/or up to $10^3$ times, or more) the mole fraction of the second solute relative to the total amount of the first solute and the second solute in liquid 168*a* received by last liquid inlet 162 of last separator stage 160. Combinations of the above-referenced ranges are possible (e.g., at least 1.01 times and up to $10^3$ times). Other ranges are also possible.

In some embodiments, the liquid having a mole fraction of the second solute relative to the sum of the first solute and the second solute that is larger than a mole fraction of the second solute relative to the sum of the first solute and the second solute in the liquid received by the last liquid inlet that is output by the liquid outlet of the last separator stage comprises predominantly the second liquid phase and a small amount, if any, of the first liquid phase. For example, as shown in FIGS. 1-2, liquid 166*a* having a mole fraction of the second solute relative to sum of the first solute and second solute that is larger than a mole fraction of the second solute relative to the sum of the first solute and the second solute in liquid 168*a* that is output by liquid outlet 166 may comprise predominantly the second liquid phase and a small amount, if any of the first liquid phase.

In some embodiments, the last separator stage comprises a liquid outlet configured to output a liquid having a mole fraction of the first solute relative to the sum of the first solute and the second solute that is larger than a mole fraction of the first solute relative to the sum of the first solute and the second solute in the feed liquid stream. FIGS. 1-2 illustrate examples of one such set of embodiments. As shown in FIGS. 1-2, last separator stage 160 comprises liquid outlet 164 configured to output liquid 164*a* having a mole fraction of the first solute relative to the sum of the first solute and the second solute that is larger than a mole fraction of the first solute relative to the sum of the first solute and the second solute in feed liquid stream 112*a*. In some embodiments, the mole fraction of the first solute relative to the total amount of the first solute and the second solute in the liquid (e.g., liquid 164*a* in FIGS. 1-2) enriched in the first solute relative to the feed liquid stream that is output by the liquid outlet of the last separator stage may be at least 1.01 times, at least 1.05 times, at least 1.1 times, at least 1.2 times, at least 1.5 times, at least 2 times, at least 3 times, at least 5 times, at least 10 times, at least 50 times, at least 100 times, at least 1000 times, or at least $10^5$ times (and/or up to $10^6$ times, up to $10^7$ times, up to $10^8$ times, or more) the mole fraction of the first solute relative to the total amount of the first solute and the second solute in the feed liquid stream (e.g., feed liquid stream 112*a* in FIGS. 1-2). Combination of the above-referenced ranges are possible (e.g., at least 1.01 times and up to $10^8$ times). Other ranges are also possible.

In accordance with certain embodiments, a liquid output from a liquid outlet of the last separator stage has a mole fraction of the first solute relative to the sum of the first solute and the second solute that is larger than a mole fraction of the first solute relative to the sum of the first solute and the second solute in the liquid (e.g., a mixed liquid stream) received by the last liquid inlet of the last separator stage. As shown in FIGS. 1-2, liquid 164*a* output from liquid outlet 164 of last separator stage 160 may have a mole fraction of the first solute relative to the sum of the first solute and the second solute that is larger than a mole fraction of the first solute relative to the sum of the first solute and the second solute in liquid 168*a* (e.g., a mixed liquid stream) received by last liquid inlet 162 of last separator stage 160. In some embodiments, the mole fraction of the first solute relative to the total amount of the first solute and the second solute in the liquid (e.g., liquid 164*a* in FIGS. 1-2) output from the liquid outlet of the last stage separator may be at least 1.01 times, at least 1.05 times, at least 1.1 times, at least 1.2 times, at least 1.5 times, at least 2 times, at least 3 times, at least 5 times, at least 10 times, at least 50 times, at least 100 times, or at least 500 times (and/or up to $10^3$ times, or more) the mole fraction of the first solute relative to the total amount of the first solute and the second solute in the liquid (e.g., liquid 168*a* in FIGS. 1-2) received by the last stage inlet of the last separator stage. Combination of the above-referenced ranges are possible (e.g., at least 1.01 times and up to $10^3$ times). Other ranges are also possible.

In some embodiments, the first solute makes up a relatively high percentage of a total amount of the first solute and the second solute contained within the liquid (e.g., liquid 164*a* in FIGS. 1-2) that is output from the liquid outlet (e.g., liquid outlet 164) of the last separator stage (e.g., last separator stage 160). For example, in some embodiments, the first solute makes up at least 80 wt. % (e.g., at least 85 wt. %, at least 90 wt. %, at least 95 wt. %, at least 97 wt. %, at least 98 wt. %, at least 99 wt. %, at least 99.5 wt. %, at least 99.9 wt. %) and/or up to 99.99 wt. % (e.g., up to 100 wt. %) of the total amount of the first solute and the second solute contained within liquid 164*a* that is output by liquid outlet 164 of last separator stage 160. Combinations of the above-referenced ranges are possible (e.g., at least 80 wt. % and up to 100 wt. %). Other ranges are also possible. In one set of embodiments, the liquid output comprises a negligible amount, if any, of the second solute (e.g., such that first solute makes up 100 wt. % of total amount of solutes).

In some embodiments, the liquid having a mole fraction of the first solute relative to the sum of the first solute and the second solute that is larger than a mole fraction of the first solute relative to the sum of the first solute and the second solute in the feed liquid stream that is output from the liquid outlet of the last separator stage comprises predominantly the first liquid phase and a small amount, if any, of the second liquid phase. FIGS. 1-2 illustrate examples of one such set of embodiments. As shown in FIGS. 1-2, liquid 164*a* having a mole fraction of the first solute relative to the sum of the first solute and the second solute that is larger than a mole fraction of the first solute relative to the sum of the first solute and the second solute in feed liquid stream 112*a* that is output from liquid outlet 164 of last separator stage 160 comprises predominantly the first liquid phase and little to none of the second liquid phase.

It should be understood that the additional intermediate separator stages (e.g., additional intermediate separator stages 130 and 150) illustrated in FIG. 2 may be similar to or the same as the intermediate separator stage (e.g., intermediate separator stage 140) illustrated in FIG. 1. Similarly, the various input liquid streams (e.g., liquid 158*a*, liquid 138*a*) and/or output liquid streams (e.g., liquids 134*a* and 136*a*, liquids 154*a* and 156*a*) associated with the additional intermediate separator stages (e.g., additional intermediate separator stages 130 and 150) shown in FIG. 2 may comprise similar compositions as described elsewhere herein with respect to the corresponding input liquid stream (e.g., liquid 148*a*) and/or output liquid streams (e.g., liquids 144*a* and 146*a*) of the intermediate separator stage (e.g., intermediate separator stage 140) illustrated in FIG. 1.

In some embodiments, a method for separating a first solute from a second solute in a feed liquid stream is described. The separation may be performed using the liquid-liquid chromatographic separator systems described herein. For example, the liquid-liquid chromatographic separator systems may comprise a plurality of separator stages (e.g., three or more separator stages) arranged in series with one another from a first separator stage to a last separator stage, with one or more intermediate stages positioned between the first separator stage and the last separator stage. Non-limiting examples of one such set of embodiments are described elsewhere herein and/or with respect to FIGS. 1-2.

Certain embodiments comprise transporting (e.g., continuously transporting) a feed liquid stream comprising a first solute and a second solute into a feed liquid inlet of a liquid-liquid chromatographic separator system. FIGS. 1-2 illustrate examples of one such set of embodiments. For example, as shown in FIGS. 1-2, feed liquid stream 112*a* comprising a first solute and a second solute may be transported into feed liquid inlet 112 of liquid-liquid chromatographic separator systems 100*a* and 100*b*.

In some embodiments, the feed liquid stream feeds (e.g., either directly or indirectly) into at least one of one or more the intermediate separator stages before passing through the first separator stage or the last separator stage. FIGS. 1-2 illustrate examples of one such set of embodiments. For example, as shown in FIG. 1, feed liquid stream 112*a* may feed directly into intermediate separator stage 140 before passing through first separator stage 120 or last separator stage 160. In embodiments in which additional intermediate separator stages are present (e.g., as shown in FIG. 2), feed liquid stream 112*a* may feed indirectly into additional intermediate separator stages 150 and 130 after first feeding into intermediate separator stage 140.

While FIGS. 1-2 illustrate non-limiting embodiments of transporting the feed liquid stream directly into a particular intermediate separator stage (e.g., intermediate separator stage 140), it should be understood that not all embodiments described herein are so limiting, and in other embodiments, the feed liquid stream may be transported directly into a feed liquid inlet positioned adjacent any appropriate intermediate separator stage. For example, in some embodiments, the feed liquid stream may be transported into a feed liquid inlet positioned adjacent any additional intermediate separator stages (e.g., additional separator stage 130 and/or 150 as shown in FIG. 2), e.g., such that the feed liquid stream feeds directly into the additional intermediate separator stages before passing through the first separator stage or the last separator stage.

In some embodiments, the method comprises transporting a first liquid phase from a source containing the first liquid phase into a first liquid inlet of the first separator stage. In accordance with some embodiments, the method comprises transporting a second liquid phase distinct from (e.g., immiscible with) the first liquid into a last liquid inlet of a last separator stage from a source containing the second liquid phase. FIGS. 1-2 illustrate examples of one such set of embodiments. For example, as shown in FIGS. 1-2, first liquid phase 114*a* from source 114 containing the first liquid phase may be transported into first liquid inlet 122 of first separator stage 120, while second liquid phase 116*a* from source 116 containing the second liquid phase may be transported into last liquid inlet 162 of last separator stage 160.

Certain embodiments comprise transporting a liquid (e.g., a mixed liquid stream) comprising at least a portion of the first solute from the feed liquid stream and at least a portion of the second solute from the feed liquid stream into a first liquid inlet of a first separator stage. FIGS. 1-2 illustrate examples of one such set of embodiments. For example, as shown in FIGS. 1-2, liquid 128*a* comprising at least a portion of the first solute from feed liquid stream 112*a* and at least a portion of the second solute from feed liquid stream 112*a* may be transported into first liquid inlet 122 of first separator stage 120. As mentioned elsewhere herein, the mixed liquid stream transported into the first liquid inlet may be a liquid comprising the first liquid phase and the second liquid phase distinct from (e.g., immiscible with) the first liquid phase.

In accordance with some embodiments, the mixed liquid stream transported into the first liquid inlet may be formed by combining, at a mixing region adjacent the first liquid inlet, the first liquid phase from the source containing the first liquid phase with a liquid from a liquid outlet of at least one of the one or more intermediate separator stages. In accordance with certain embodiments, the liquid stream from the liquid outlet of the at least one or the one or more intermediate separator stages may comprise predominantly the second liquid phase as opposed to the first liquid phase. FIG. 1 illustrates an example of one such set of embodiments. For example, as shown in FIG. 1, mixed liquid stream 128*a* transported into first liquid inlet 122 may be formed by combining, at mixing region 128, first liquid phase 114*a* from source 114 containing the first liquid phase with liquid 146*a* from liquid outlet 146 of intermediate separator stage 140. In some cases, liquid 146*a* comprises predominantly the second liquid phase as opposed to the first liquid phase. As such, the resulting mixed liquid stream 128*a* may be a stream comprising the first liquid phase and the second liquid phase.

While FIG. 1 illustrates a non-limiting embodiment of combining the first liquid phase from the source containing the first liquid phase with a liquid from a liquid outlet of a particular intermediate separator stage (e.g., intermediate separator stage 140), it should be understood that not all embodiments described herein are so limiting, and in other embodiments, the first liquid phase from the source containing the first liquid phase may be combined with a liquid from a liquid outlet of any appropriate intermediate separator stage. For example, as shown in FIG. 2, when one or more additional intermediate separator stages (e.g., intermediate separator stage 130) are present between intermediate separator stage 140 and first separator stage 120, first liquid phase 114*a* from source 114 containing the first liquid phase may be combined with liquid 136*a* from liquid outlet 136 of additional intermediate separator stage 130 to form mixed liquid stream 128*a*.

In some embodiments, as the liquid comprising at least a portion of the first solute and at least a portion of the second solute is transported into the first liquid inlet, the first separator stage produces a liquid having a mole fraction of the second solute relative to the sum of the first solute and the second solute that is larger than a mole fraction of the second solute relative to the sum of the first solute and the second solute in the feed liquid stream and a liquid having a mole fraction of the first solute relative to the sum of the first solute and the second solute that is larger than a mole fraction of the first solute relative to the sum of the first solute and the second solute in the liquid received by the first liquid inlet of the first separator stage. In accordance with certain embodiments, the liquid produced by the liquid outlet of the first separator stage may also have a mole fraction of the second solute relative to the sum of the first solute and the second solute that is larger than a mole fraction of the second solute relative to the sum of the first solute and the second solute in the liquid received by the first liquid inlet. For example, as shown in FIGS. 1-2, as liquid 128*a* comprising at least a portion of the first solute and at least a portion of the second solute is transported into first liquid inlet 122, first separator stage 120 produces liquid 126*a* having a mole fraction of the second solute relative to the sum of the first solute and the second solute that is larger than a mole fraction of the second solute relative to the sum of the first solute and the second solute in feed liquid stream 112*a* and liquid 124*a* having a mole fraction of the first solute relative to the sum of the first solute and the second solute that is larger than a mole fraction of the first solute relative to the sum of the first solute and the second solute in liquid 128*a* received by first liquid inlet 122 of first separator stage 120. Liquid 126*a* produced by liquid outlet 126 of first separator stage 120 may also have a mole fraction of the second solute relative to the sum of the first solute and the second solute that is larger than a mole fraction of the second solute relative to the sum of the first solute and the second solute in liquid 128*a* received by first liquid inlet 122. The liquid comprising at least a portion of the first solute and at least a portion of the second solute may comprise any of a variety of appropriate amounts of the first solute and the second solute described elsewhere herein and/or with respect to FIGS. 1-2.

Certain embodiments comprise transporting a liquid (e.g., a mixed liquid stream) comprising at least a portion of the first solute and at least a portion of the second solute into an intermediate liquid inlet of at least one of the one or more intermediate separator stages. FIG. 1 illustrates an example of one such set of embodiments. As shown in FIG. 1, liquid 148*a* (e.g., a mixed liquid stream) comprising at least a portion of the first solute and at least a portion of the second solute may be transported into intermediate liquid inlet 142 of intermediate separator stage 140. As mentioned elsewhere herein, the mixed liquid stream transported into the intermediate liquid inlet can comprise the first liquid phase and the second liquid phase.

In accordance with some embodiments, the mixed liquid stream transported into the intermediate liquid inlet may be formed by combining, at a mixing region adjacent the intermediate liquid inlet, a liquid stream from a liquid outlet of a preceding separator stage and a liquid stream from a liquid outlet of a next separator stage. Depending on the number of intermediate separator stage(s) present and their relative placement in the liquid-liquid chromatographic separator system, the preceding separator stage may either be another intermediate separator stage or the first separator stage. Similarly, the next separator stage may either be another intermediate separator stage or the last separator stage. In some cases, the liquid stream from the outlet of the preceding separator stage is a liquid comprising predominantly the first liquid phase as opposed to the second liquid phase, while the liquid stream from the outlet of the next separator stage is a liquid comprising predominantly the second liquid phase as opposed to the first liquid phase. Accordingly, a combination of the two liquid streams at the mixing region may result in the formation of the mixed liquid stream comprising two distinct (e.g., immiscible) phases. In some embodiments, the mixed liquid stream may be further combined with a feed liquid stream before being transported into the intermediate liquid inlet.

FIG. 1 illustrates an example of one such set of embodiments for a liquid-liquid chromatographic separator system comprising three or more separator stages. For example, as shown in FIG. 1, mixed liquid stream 148*a* (e.g., a mixed liquid stream) transported into intermediate liquid inlet 142 may be formed by combining, at mixing region 148 adjacent intermediate liquid inlet 142, liquid 124*a* from liquid outlet 124 of first separator stage 120 (e.g., the preceding separator stage) and liquid 166*a* from liquid outlet 166 of last separator stage 160 (e.g., the next separator stage). While liquid 124*a* comprises predominantly the first liquid phase as opposed to the second liquid phase, liquid 166*a* comprises predominantly the second liquid phase as opposed to the first liquid phase. Mixed liquid stream 148*a* may be further combined with feed liquid stream 112*a* prior being transported into intermediate stage inlet 142 of intermediate separator stage 140.

FIG. 2 illustrates an example of one such set of embodiments for a liquid-liquid chromatographic separator system comprising five or more separator stages. For example, as shown in FIG. 2, mixed liquid stream 48*a* transported into intermediate liquid inlet 142 may be formed by combining, at mixing region 148 adjacent intermediate liquid inlet 142, liquid 134*a* from liquid outlet 134 of first additional intermediate separator stage 130 (e.g., the preceding separator stage) and liquid 156*a* from liquid outlet 156 of second additional intermediate separator stage 150 (e.g., the next separator stage). While liquid 134*a* comprises predominantly the first liquid phase as opposed to the second liquid phase, liquid 156*a* comprises predominantly the second liquid phase as opposed to the first liquid phase. Mixed liquid stream 148*a* may be further combined with feed liquid stream 112*a* prior being transported into intermediate stage inlet 142 of intermediate separator stage 140.

In some embodiments, as the liquid comprising at least a portion of the first solute and at least a portion of the second solute is transported into the intermediate liquid inlet of at least one of the one or more intermediate separator stages, the at least one intermediate separator stage produces a liquid having a mole fraction of the first solute relative to the sum of the first solute and the second solute that is larger than a mole fraction of the first solute relative to the sum of the first solute and the second solute in the liquid received by the intermediate liquid inlet, and a liquid having a mole fraction of the second solute relative to the sum of the first solute and the second solute that is larger than a mole fraction of the second solute relative to the sum of the first solute and the second solute in the liquid received by the intermediate liquid inlet. FIG. 1 illustrates an example of one such set of embodiments. As shown in FIG. 1, as liquid 148*a* (e.g., a mixed liquid stream) comprising at least a portion of the first solute and at least a portion of the second solute is transported into intermediate liquid inlet 142 of intermediate separator stage 140, intermediate separator stage 140 produces liquid 144*a* having a mole fraction of the first solute relative to the sum of the first solute and the second solute that is larger than a mole fraction of the first solute relative to the sum of the first solute and the second solute in liquid 148*a* received by intermediate liquid inlet 142, and liquid 146*a* having a mole fraction of the second solute relative to the sum of the first solute and the second solute that is larger than a mole fraction of the second solute relative to the sum of the first solute and the second solute in liquid 148*a* received by intermediate liquid inlet 142.

It should be understood that the additional intermediate separator stages (e.g., additional intermediate separator stages 130 and 150) shown in FIG. 2 may function in a similar manner as the intermediate separator stage (e.g., intermediate separator stage 140) shown in FIG. 1. For example, for each of the additional intermediate separator stages (e.g., separator stage 130 or 150), a mixed liquid stream (e.g., liquid 138*a* or 158*a*) comprising at least a portion of the first solute and at least a portion of the second solute may be transported into the intermediate liquid inlet (e.g., inlet 132 or 152) of the corresponding additional intermediate separator stage, thereby producing a liquid (e.g., liquid 134*a* or 154*a*) having a mole fraction of the first solute relative to the sum of the first solute and the second solute that is larger than a mole fraction of the first solute relative to the sum of the first solute and the second solute in the liquid (e.g., liquid 138*a* or 158*a*) received by the intermediate liquid inlet (e.g., inlet 132 or 152), and a liquid (e.g., liquid 136*a* or 156*a*) having a mole fraction of the second solute relative to the sum of the first solute and the second solute that is larger than a mole fraction of the second solute relative to the sum of the first solute and the second solute in the liquid (e.g., liquid 138*a* or 158*a*) received by the intermediate liquid inlet (e.g., inlet 132 or 152).

Certain embodiments comprise transporting at least a portion of the liquid produced by the intermediate separator stage (and having a mole fraction of the second solute relative to the sum of the first solute and the second solute that is larger than a mole fraction of the second solute relative to the sum of the first solute and the second solute in the liquid received by the intermediate liquid inlet) into a liquid inlet of a preceding separator stage. Depending on the number of intermediate separator stage(s) present and their relative placement in the liquid-liquid chromatographic separator system, the preceding separator stage may either be another intermediate separator stage or the first separator stage. FIGS. 1-2 illustrate examples of one such set of embodiments. For example, as shown in FIG. 1, liquid 146*a* that is produced by intermediate separator stage 140 may be transported into first liquid inlet 122 of first separator stage 120 (e.g., the preceding separator stage). For another example, as shown in FIG. 2, when one or more additional intermediate separator stages (e.g., second additional intermediate stage 130) are present between intermediate separator stage 140 and first separator stage 120, liquid 146*a* that is produced by intermediate separator stage 140 may be instead transported to liquid inlet 132 of first additional intermediate separator stage 130, before being subsequently transported to first liquid inlet 122 of first separator stage 120.

Certain embodiments comprise transporting at least a portion of the liquid that is produced by at least one of the one or more intermediate separator stages (and having a mole fraction of the first solute relative to the sum of the first solute and the second solute that is larger than a mole fraction of the first solute relative to the sum of the first solute and the second solute in the liquid received by the intermediate liquid inlet) into a liquid inlet of the next separator stage. Depending on the number of intermediate separator stage(s) present and their relative placement in the liquid-liquid chromatographic separator system, the next separator stage may either be another intermediate separator stage or the last separator stage. FIGS. 1-2 illustrate examples of one such set of embodiments. For example, as shown in FIG. 1, liquid 144*a* that is produced by intermediate separator stage 140 may be transported into last liquid inlet 162 of last separator stage 160 (e.g., the next separator stage). For another example, as shown in FIG. 2, when additional intermediate separator stages (e.g., second additional intermediate stage 150) are present between intermediate separator stage 140 and last separator stage 160, liquid 144*a* that is produced by intermediate separator stage 140 may be instead transported to liquid inlet 152 of second additional intermediate separator stage 150, before being transported to last liquid inlet 162 of last separator stage 160.

Certain embodiments comprise transporting a liquid (e.g., a mixed liquid stream) comprising at least a portion of the first solute and at least a portion of the second solute into a last liquid inlet of the last separator stage. For example, as shown in FIGS. 1-2, liquid 168*a* comprising at least a portion of the first solute and at least a portion of the second solute may be transported into last liquid inlet 162 of last separator stage 160. As mentioned elsewhere herein, the mixed liquid stream transported into the last liquid inlet may be a liquid comprising the first liquid phase and the second liquid phase distinct from (e.g., immiscible with) the first liquid phase.

In accordance with some embodiments, the mixed liquid stream transported into the last liquid inlet may be formed by combining, at a mixing region adjacent the last liquid inlet, the second liquid phase from the source containing the second liquid phase with a liquid from a liquid outlet of at least one of the one or more intermediate separator stages. In accordance with certain embodiments, the liquid stream from the liquid outlet of the at least one of the one or more intermediate separator stages may comprise predominantly the first liquid phase as opposed to the second liquid phase. FIG. 1 illustrates an example of one such set of embodiments. For example, as shown in FIG. 1, mixed liquid stream 168*a* transported into last liquid inlet 162 may be formed by combining, at mixing region 168, second liquid phase 116*a* from source 116 containing the second liquid phase with liquid 144*a* from liquid outlet 144 of intermediate separator stage 140. In some cases, liquid 144*a* comprises predominantly the first liquid phase as opposed to the second liquid phase. As such, the resulting mixed liquid stream 168*a* may be a stream comprising the first liquid phase and the second liquid phase.

While FIG. 1 illustrates an non-limiting embodiment of combining, at a mixing region, the second liquid phase from the source containing the second liquid phase with a liquid from a liquid outlet of a particular intermediate separator stage (e.g., intermediate separator stage 140), it should be understood that not all embodiments described herein are so limiting, and in other embodiments, the second liquid phase from the source containing the second liquid phase may be combined with a liquid from a liquid outlet of any appropriate intermediate separator stage. For example, as shown in FIG. 2, when one or more additional intermediate separator stages (e.g., intermediate separator stage 150) are present between intermediate separator stage 140 and last separator stage 160, second liquid phase 116*a* from source 116 containing the second liquid phase may be combined with liquid 154*a* from liquid outlet 154 of additional intermediate separator stage 150 to form mixed liquid stream 168*a*.

In some embodiments, as the liquid comprising at least a portion of the first solute and at least a portion of the second solute is transported into the last liquid inlet of the last separator stage, the last separator stage produces a liquid having a mole fraction of the first solute relative to the sum of the first solute and the second solute that is larger than a mole fraction of the first solute relative to the sum of the first solute and the second solute in the feed liquid stream, and a liquid having a mole fraction of the second solute relative to the sum of the first solute and the second solute that is larger than a mole fraction of the second solute relative to the sum of the first solute and the second solute in the liquid received by the last liquid inlet. In accordance with certain embodiments, the liquid produced by the liquid outlet of the last separator stage may also have a mole fraction of the first solute relative to the sum of the first solute and the second solute that is larger than a mole fraction of the first solute relative to the sum of the first solute and the second solute in the liquid received by the last liquid inlet. For example, as shown in FIGS. 1-2, as liquid 168*a* comprising at least a portion of the first solute and at least a portion of the second solute is transported into last liquid inlet 162 of last separator stage 160, last separator stage 162 produces liquid 164*a* having a mole fraction of the first solute relative to the sum of the first solute and the second solute that is larger than a mole fraction of the first solute relative to the sum of the first solute and the second solute in the feed liquid stream, and liquid 166*a* having a mole fraction of the second solute relative to the sum of the first solute and the second solute that is larger than a mole fraction of the second solute relative to the sum of the first solute and the second solute in liquid 168*a* received by last liquid inlet 162. Additionally, liquid 164*a* produced by liquid outlet 164 of last separator stage 160 may also have a mole fraction of the first solute relative to the sum of the first solute and the second solute that is larger than a mole fraction of the first solute relative to the sum of the first solute and the second solute in liquid 168*a* received by last liquid inlet 162.

As noted above, certain embodiments are directed to liquid-liquid chromatographic separator systems and associated methods. As used herein, a "liquid-liquid chromatographic separator" is one in which two liquid phases are used to separate two solutes, with at least one set of streams in the system becoming more and more enriched with one of the solutes as one moves from stage to stage. For example, in FIG. 1, output streams 144*a* and 164*a* become more and more enriched in the first solute as one moves from stage 140 to stage 160 (i.e., from right to left in FIG. 1). Similarly, in FIG. 2, output streams 144*a*, 154*a*, and 164*a* become more and more enriched in the first solute as one moves from stage 140 to stage 150 to stage 160 (i.e., from right to left in FIG. 2). In some such embodiments, at least one set of streams in the system becomes more and more enriched with the second solute as one moves from stage to stage in the opposite direction. For example, in FIG. 1, output streams 146*a* and 126*a* become more and more enriched in the second solute as one moves from stage 140 to stage 120 (i.e., from left to right in FIG. 1). Similarly, in FIG. 2, output streams 146*a*, 136*a*, and 126*a* become more and more enriched in the second solute as one moves from stage 140 to stage 130 to stage 120 (i.e., from left to right in FIG. 2).

In some embodiments, the liquid-liquid chromatographic separator system described herein is configured to be operated continuously. A system is said to be operating "continuously" when, for at least a period of time, the system takes in an input and outputs an output. For example, the system can be operated continuously when a feed liquid stream comprising the first solute and the second solute is transported into the system while, at the same time, a liquid stream having a mole fraction of the first solute relative to the sum of the first solute and the second solute that is larger than a mole fraction of the first solute relative to the sum of the first solute and the second solute in the feed liquid stream is output from the system. In some embodiments, for at least a period of time, a feed liquid stream comprising the first solute and the second solute is transported into the system while, at the same time, a liquid stream having a mole fraction of the first solute relative to the sum of the first solute and the second solute that is larger than a mole fraction of the first solute relative to the sum of the first solute and the second solute in the feed liquid stream is output from the system and a liquid stream having a mole fraction of the second solute relative to the sum of the first solute and the second solute that is larger than a mole fraction of the second solute relative to the sum of the first solute and the second solute in the feed liquid stream is output from the system. Advantages associated with a continuous operation may include, but are not limited to, high-throughput of purified liquids stream containing a target solute, reduced amount of extraction liquid, reduced number of extraction stages associated with the separation process, and reduced overall operational costs.

In some embodiments, the liquid-liquid chromatographic separator system is a counter-current liquid-liquid chromatographic separator system. In a counter-counter liquid-liquid chromatographic separator system, two liquid phases (e.g., a first liquid phase, a second liquid phase) flow from stage to stage in opposite directions (e.g., such that two liquids, e.g., one liquid comprising predominantly the first liquid phase and having a mole fraction of the first solute relative to the sum of the first solute and the second solute that is larger than a mole fraction of the first solute relative to the sum of the first solute and the second solute in the feed liquid stream and the other liquid comprising the second liquid phase and having a mole fraction of the second solute relative to the sum of the first solute and the second solute that is larger than a mole fraction of the second solute relative to the sum of the first solute and the second solute in the feed liquid stream, may be produced). Non-limiting examples of counter-current liquid-liquid chromatographic separator systems are illustrated in FIGS. 1-2. As shown in FIGS. 1-2, in counter-current liquid-liquid chromatographic separator systems 100*a* and 100*b*, first liquid phase 114*a* and second liquid phase 116*a* may enter into the systems from opposite sides of the separation system and flow, from stage to stage, in opposite directions. Two liquids, e.g., liquid 164*a* comprising predominantly the first liquid phase and having a mole fraction of the first solute relative to the sum of the first solute and the second solute that is larger than a mole fraction of the first solute relative to the sum of the first solute and the second solute in the feed liquid stream, and liquid 126*a* comprising predominantly the second liquid phase and having a mole fraction of the second solute relative to the sum of the first solute and the second solute that is larger than a mole fraction of the second solute relative to the sum of the first solute and the second solute in the feed liquid stream, may be produced.

The first solute and the second solute may have any of a variety of partition coefficients between the first liquid phase and the second liquid phase. The first solute may have a partition coefficient $K_1$, which is expressed as a ratio of the concentration of the first solute in the first liquid phase to the concentration of the first solute in the second liquid phase at equilibrium (e.g., $K_1=C_{1\ (1st\ liquid\ phase)}/C_{1,\ (2nd\ liquid\ phase)}$). Similarly, the second solute may have a partition coefficient $K_2$, where $K_2$ is expressed as a ratio of the concentration of the second solute in the first liquid phase to the concentration of the second solute in the second liquid phase (e.g., $K_2=C_{2\ (1st\ liquid\ phase)}/C_{2\ (2nd\ liquid\ phase)}$).

In some embodiments, the first solute has a partition coefficient Kr between the first liquid phase and the second liquid phase of greater than or equal to 0.1, greater than or equal to 0.25, greater than or equal to 0.5, greater than or equal to 0.75, greater than or equal to 1, greater than or equal to 1.05, greater than or equal to 1.1, greater than or equal to 1.15, greater than or equal to 1.2, greater than or equal to 1.25, greater than or equal to 1.3, greater than or equal to 1.4, greater than or equal to 1.6, greater than or equal to 1.8, greater than or equal to 2, greater than or equal to 3, greater than or equal to 5, or greater than or equal to 10. In some embodiments, the first solute has a partition coefficient Kr between the first liquid phase and the second liquid phase of up to 20, up to 40, up to 60, up to 80, up to 100, up to 200, up to 500, up to 1000, or greater. Combinations of the above-referenced ranges are possible (e.g., greater than or equal to 0.1 and up to 1000, greater than or equal to 1 and up to 100). Other ranges are also possible.

In some embodiments, the second solute has a partition coefficient $K_2$ between the first liquid phase and the second liquid phase of less than or equal to 10, less than or equal to 9, less than or equal to 8, less than or equal to 6, less than or equal to 4, less than or equal to 3, less than or equal to 2, less than or equal to 1, less than or equal to 0.99, less than or equal to 0.97, less than or equal to 0.95, less than or equal to 0.9, less than or equal to 0.85, less than or equal to 0.8, less than or equal to 0.7, less than or equal to 0.6, less than or equal to 0.4, or less than or equal to 0.2 (and/or down to 0.01, down to 0.001, or less). Combinations of the above-referenced ranges are possible (e.g., less than or equal to 10 and down to 0.001, less than 1 and down to 0.001). Other ranges are also possible.

In some embodiments, it may be particularly advantageous to select a first liquid phase and a second liquid that gives rise to a partition coefficient $K_1$ for the first solute of greater than 1, and a partition coefficient $K_2$ for the second solute of less than 1. Such a combination of partition coefficients may result in a higher separation efficiency of the first solute and the second solute and may be associated with certain operational advantages (e.g., need for less solvent, lower number of extraction stages, etc.).

In some embodiments, the association of the chemical species (e.g., the first solute and the second solute) with their respective liquid phases (e.g., the first liquid phase, the second liquid phase) in the heterogeneous liquid mixture may correlate with the ability of the chemical species to selectively partition into the different liquid phases and the volumetric ratio between the different liquid phases. For example, in a biphasic heterogeneous liquid mixture comprising a first liquid phase and a second liquid phase, the association of a chemical species with the liquid phases may correlate with an extraction factor Y. For example, for chemical species i, the extraction factor $Y_i$ may be expressed as: $Y_i=K_i\cdot(V_{1st\ liquid\ phase}/V_{2nd\ liquid\ phase})$, which is the product of the partition coefficient $K_i$ for species i and a ratio of a volume factor of the first liquid phase ($V_{1st\ liquid\ phase}$) and a volume factor of the second liquid phase ($V_{2nd\ liquid\ phase}$). In cases where the separation process is a batch separation process, the volume factor of each phase is the volume of that phase that is present (i.e., in a batch separation process, $V_{1st\ liquid}$ phase corresponds to the volume of the first liquid phase that is present, and $V_{2nd\ liquid}$ phase corresponds to the volume of the second liquid phase that is present). In cases where the separation process is one in which the first and second phases are flowed (e.g., in a continuous separation process), the volume factor of each phase is the volumetric flow rate of that phase (i.e., in a separation process in which the phases are flowing, $V_{1st\ liquid\ phase}$ corresponds to the volumetric flow rate of the first liquid phase, and $V_{2nd\ liquid\ phase}$ corresponds to the volumetric flow rate of the second liquid phase). As noted elsewhere herein, for chemical species i, the partition coefficient $K_i$ may be expressed as: $K_i=C_{i\ (1st\ liquid\ phase)}/C_{i\ (2nd\ liquid\ phase)}$, which is a ratio of the concentration of chemical species i in the first liquid phase ($C_{i,\ 1st\ liquid\ phase}$) to the concentration of chemical species i in the second liquid phase ($C_{i,\ 2st\ liquid\ phase}$).

In the context of the present disclosure, chemical species i may refer to the solute within the liquid phases. For example, in embodiments in which the mixture comprises a first solute and a second solute, the first solute may have an extraction factor $Y_1$, which, as described above, is expressed as a product of the partition coefficient $K_1$ of the first solute and the volume factor ratio ($V_{1st\ liquid\ phase}/V_{2nd\ liquid\ phase}$) between the first liquid phase and the second liquid phase, where $K_1$ is expressed as a ratio of the concentration of the first solute in the first liquid phase to the concentration of first solute in the second liquid phase (e.g., $K_1=C_{1\ (1st\ liquid\ phase)}/C_{1\ (2nd\ liquid\ phase)}$). Similarly, in embodiments in which the mixture comprises a first solute and a second solute, the second solute may have an extraction factor $Y_2$, which, as described above, is expressed as a product of the partition coefficient $K_2$ of the second solute and the volume factor ratio ($V_{1st\ liquid\ phase}/V_{2nd\ liquid\ phase}$) between the first liquid phase and the second liquid phase, where $K_2$ is expressed as a ratio of the concentration of the second solute in the first liquid phase to the concentration of second solute in the second liquid phase (e.g., $K_2=C_{2\ (1st\ liquid\ phase)}/C_{2\ (2nd\ liquid\ phase)}$).

In some embodiments, it may be advantageous to select a heterogeneous liquid mixture having a particular combination of extraction factors (e.g., $Y_1$, $Y_2$), e.g., such as an extraction factor $Y_1$ of the first solute of greater than 1 and an extraction factor $Y_2$ of the second solute of less than 1, or vice versa. Without wishing to be bound by any particular theory, it is hypothesized that such a particular combination of extraction factors may lead to efficient separation of the first solute from the second solute. For example, in some embodiments, the first solute may have an extraction factor $Y_1$ of greater than 1, greater than or equal to 1.05, greater than or equal to 1.1, greater than or equal to 1.15, greater than or equal to 1.2, greater than or equal to 1.25, greater than or equal to 1.3, greater than or equal to 1.4, greater than or equal to 1.6, greater than or equal to 1.8, greater than or equal to 2, or greater (and/or, in some embodiments, up to 2.5, up to 3, up to 4, up to 5, up to 6, up to 8, or up to 10, or more). Combinations of the above-referenced ranges are possible (e.g., greater than 1 and up to 10). Other ranges are also possible. Additionally, in some embodiments, the second solute may have an extraction factor $Y_2$ of less than 1, less than or equal to 0.99, less than or equal to 0.97, less than or equal to 0.95, less than or equal to 0.9, less than or equal to 0.85, less than or equal to 0.8, less than or equal to 0.7, less than or equal to 0.6, less than or equal to 0.4, less than or equal to 0.2, less than or equal to 0.1, or less (and/or down to 0.01, down to 0.001, or less). Combinations of the above-referenced ranges are possible (e.g., less than 1 and down to 0.001). Other ranges are also possible. In embodiments in which a multi-stage liquid-liquid extraction system is employed for separating the first solute from the second solute, the first stage, the last stage, and/or the one or more intermediate stages (and, in some embodiments, all of the first sage, the last stage, and the one or more intermediate stages) may have an extraction factor $Y_1$ for the first solute within any of the ranges outlined above. In embodiments in which a multi-stage liquid-liquid extraction system is employed for separating the first solute from the second solute, the first stage, the last stage, and/or the one or more intermediate stages (and, in some embodiments, all of the first sage, the last stage, and the one or more intermediate stages) may have an extraction factor $Y_2$ for the second solute within any of the ranges outlined above.

In some embodiments, the first liquid phase and the second liquid phase may comprise any of a variety of immiscible liquids. In one set of embodiments, the first liquid phase may be a polar liquid (e.g., a water miscible liquid), while the second liquid phase may be a non-polar liquid (e.g., a water insoluble organic phase). In some embodiments, the first liquid phase and the second liquid phase have mutual solubilities falling within any of the ranges outlined above.

In some embodiments, the liquid-liquid chromatographic separator system further comprises a temperature control system configured to control the temperature of the various liquid streams in the system. In one set of embodiments, the temperature control system may be advantageously coupled to one or more of the mixing regions and configured to the control the temperature of the liquid streams associated with the mixing region(s). FIG. 1 illustrates an example of one such set of embodiments. As shown in FIG. 1, a temperature control system (not shown) may be advantageously coupled to one or more of the mixing region(s) (e.g., mixing regions 128, 148, 168, etc.) and configured to the control the temperature of the liquid streams (e.g., liquid 114*a*, 145*a*, 128*a*, 124*a*, 166*a*, 148*a*, 144*a*, 116*a*, 168*a*) associated with the mixing region(s).

As described elsewhere herein, the mixing region(s), by inducing mixing, may facilitate preferential association or partitioning of the first solute and the second solute into the liquid phases (e.g., the first liquid phase, the second liquid phase) within the mixed liquid stream(s). A temperature control system, by altering the temperature of the liquid streams, may be employed to alter the relative solubility of the first solute and second solute in each liquid phase, the mutual solubility between the liquid phases, and the partition coefficients of each solute. The use of a temperature control system, in accordance with certain embodiments, may allow for establishing desirable partitioning of the first solute and the second solute between the first liquid phase and the second liquid phase within the mixed liquid stream, and thereby enhancing the overall separation efficiency of the first solute and the second solute in the liquid-liquid chromatographic separator system.

As noted above, porous medium-based fluidic separators (membrane-based separators) may be employed in the separator stages described herein. Any of a variety of types of fluidic separators may be used as a separator stage, in accordance with certain of the embodiments described herein. In some embodiments, all of the fluidic separators within the separator stages may be of the same type (or may be essentially identical). In other embodiments, one or more of the separator stages in the system may be different from one or more other separator stages in the system.

As one example, a separator stage comprising a porous medium may be used (e.g., as the first separator stage, the last separator stage, and/or the intermediate separator stage(s), in certain embodiments. In some cases, the fluidic separator achieves separation through the use of interfacial tension within the pores of the porous medium. In some such cases, the pressure and/or volumetric flow rate of the incoming mixture must be sufficiently high to facilitate selective transport of the desired fluid through the pores of the porous medium while restricting transportation of the undesired fluid through the porous medium. Examples of such fluidic separators are described, for example, in International Patent Publication No. WO 2004/087283, published on Oct. 14, 2004, filed as International Patent Application No. PCT/US2004/009451 on Mar. 25, 2004, and entitled "Fluid Separation"; International Patent Publication No. WO 2007/006033, published on Jan. 11, 20017, filed as International Patent Application No. PCT/US2006/026464 on Jul. 5, 2006, and entitled "Microfluidic Separators for Multiphase Fluid-Flow Based on Membranes"; International Patent Publication No. WO 2014/026098, published on Feb. 13, 2014, filed as International Patent Application No. PCT/US2013/054312 on Aug. 9, 2013, and entitled "Pressure Control in Fluidic Systems"; and U.S. Pat. No. 10,987,671, issued on Apr. 27, 2021, and entitled "Reservoir-Based Management of Volumetric Flow Rate in Fluidic Systems," each of which is incorporated herein by reference in its entirety for all purposes.

Figure 4:
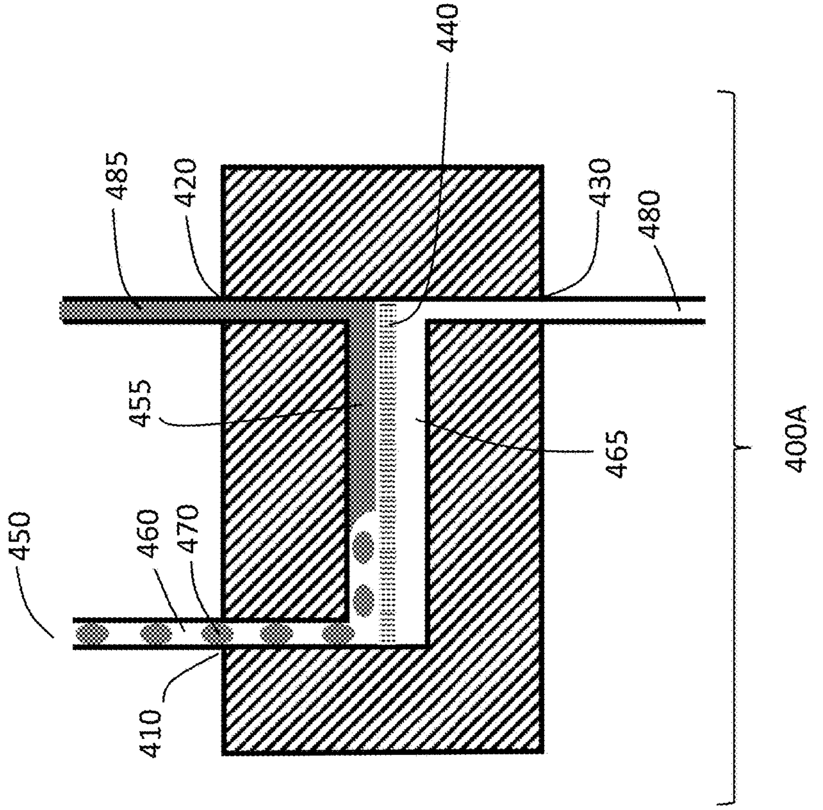
FIG. 4 is a schematic illustration showing a porous medium-based fluidic separator, according to some embodiments.

In certain embodiments, one or more of the separator stages comprises a porous medium-based fluidic separator. In certain instances, the porous medium separates the first outlet and the second outlet of one or more of the separator stages. One such exemplary separator (the type of which could be used as any of the separator stages described herein) is shown schematically in FIG. 4. In FIG. 4, separator stage 400A comprises porous medium 440 separating first outlet 420 of separator stage 400A and second outlet 430 of separator stage 400A. Non-limiting examples of porous media include porous membranes and porous discs (e.g., etched discs). In some embodiments, the porous medium of the separator comprises or is a porous membrane.

The solid portion of the porous medium can be made of any of a variety of materials including, but not limited to, metals, semiconductors, ceramics, polymers, and combinations thereof. In some embodiments, the solid portion of the porous medium comprises polyvinylidene fluoride (PVDF), polytetrafluoroethylene (PTFE), cellulose acetate, polypropylene, polyethylene, polysulfane, polyether sulfone, and/or polyvinyl chloride.

According to certain embodiments, the fluidic combination transported into the separator stage comprising the porous medium comprises a first fluid and a second fluid. For example, in FIG. 4, fluidic combination 450, transported into inlet 410 of fluidic separator 400A, comprises first fluid 460 and fluid 470. The fluidic combination may be any of variety of mixed liquid streams described elsewhere herein and/or with respect to FIGS. 1-2, e.g., such as mixed liquid stream 128*a* associated with first stage separator 120, mixed liquid stream 148*a* associated with intermediate stage separator 140, mixed liquid stream 168*a* associated with last stage separator 160, mixed liquid stream 138*a* associated with first additional intermediate stage separator 130, mixed liquid stream 158*a* associated with second additional intermediate stage separator 160.

The first and second fluids can form separate phases, in some embodiments. An example of such is shown in FIG. 4, in which fluid 470 is shown as an immiscible slug within first fluid 460. In some embodiments, the first fluid is a first liquid phase and the second fluid is a second liquid phase that is immiscible in the first liquid phase. In certain cases, the fluidic combination comprises an emulsion. The first liquid phase and the second liquid phase may include any of a variety of first liquid phase and second liquid phases described elsewhere herein and/or with respect to FIGS. 1-2.

As noted above, in certain embodiments, the porous medium is pre-wetted with one liquid (e.g., a first liquid phase or a second liquid phase) from the fluidic combination (e.g., the mixed liquid phase). In some such embodiments, the liquid type that has been used to pre-wet the porous medium is selectively passed through the pre-wetted porous medium. As would be understood by those of ordinary skill in the art, "selective" transport of a first component through a porous medium (the "selectively transported component") relative to another component (the "selectively retained component") means that a higher percentage of the selectively transported component is transported through the porous medium, resulting in the formation of a fluid on the permeate side of the porous medium that contains a larger amount of the selectively transported component relative to the fluidic combination being transported into the separator, and a fluid on the retentate side of the porous medium that contains a larger amount of the selectively retained component relative to the fluidic combination being transported into the separator. For example, in FIG. 4, porous medium 440 has been pre-wetted with the solvent of first fluid 460, such that that solvent of the first fluid (and possibly, in some embodiments, some or all solutes dissolved therein) is selectively transported through the porous medium (e.g., with application of a hydraulic pressure to the retentate side of the porous medium) while fluid 470 is selectively retained by the porous medium. The selective transport of first fluid 460 through porous medium 440 results in the formation of fluid 455 on the retentate side of porous medium 440 that is has a larger amount of fluid 470 (the selectively retained component) relative to fluidic combination 450, and the formation of fluid 465 on the permeate side of porous medium 440 that has a larger amount of first fluid 460 (the selectively transported component) relative to fluidic combination 450.

In some instances, the pores within the porous medium within a separator are sized such that, when the porous medium is pre-wetted with one of the fluids within the incoming mixture, and the pressure of the incoming stream is sufficiently high, the pre-wetted fluid type is selectively transported through the porous medium while the other fluid(s) within the incoming mixture are selectively retained by the porous medium. Specific pore properties may be selected, in certain cases, to enhance the selectivity of the porous medium for a particular fluid.

The following examples are intended to illustrate certain embodiments of the present invention, but do not exemplify the full scope of the invention.

EXAMPLE

This example describes an embodiment of a multi-stage liquid-liquid extractive chromatographic system, according to some embodiments.

Figure 3:
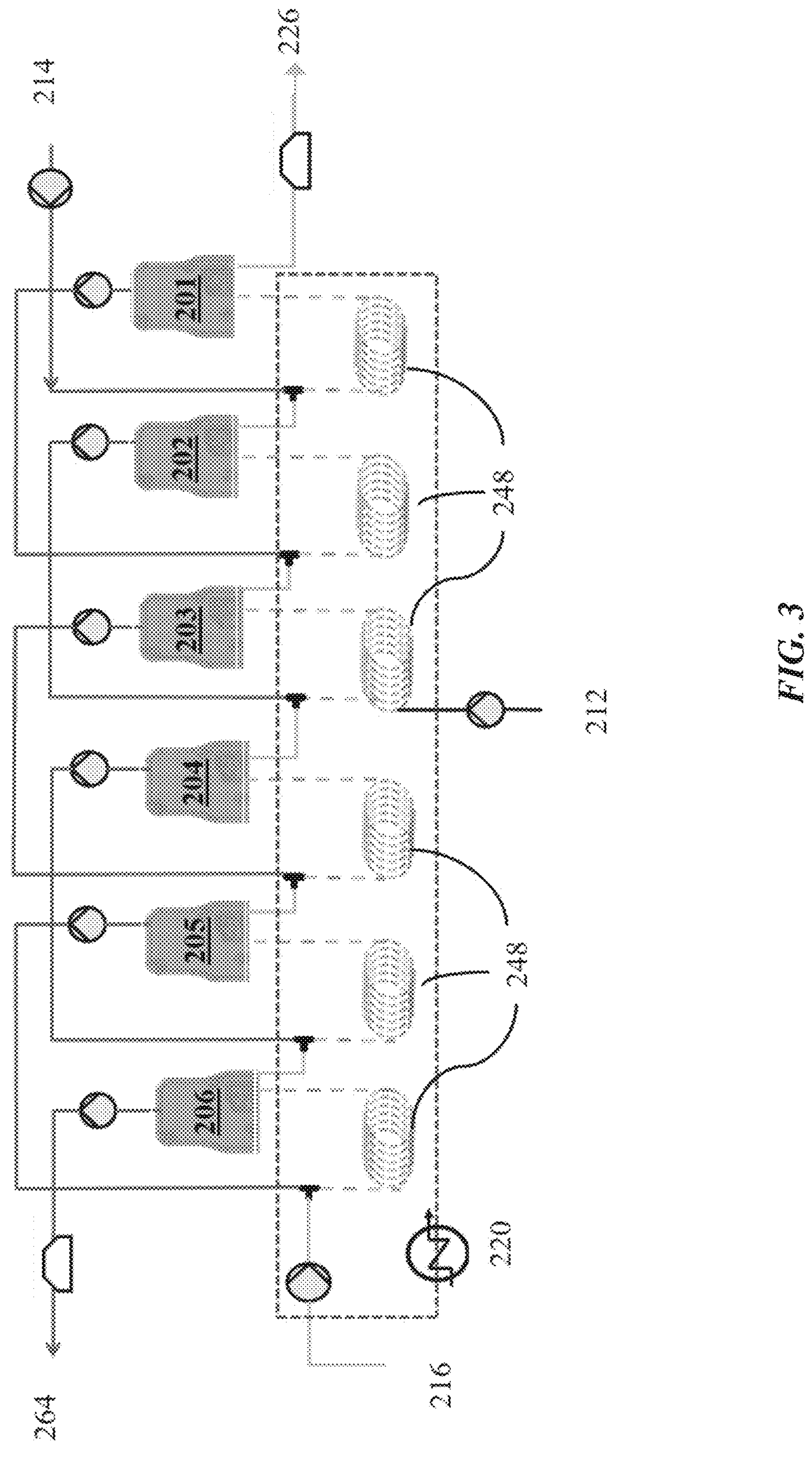
FIG. 3 is a schematic illustration showing a liquid-liquid chromatographic separator system comprising six separator stages, according to some embodiments.

A membrane-assisted multi-stage liquid-liquid extractive chromatographic system (e.g., as shown in FIG. 3) comprising a biphasic extraction liquid system is described. The countercurrent chromatographic system described herein is fully continuous, e.g., such that the sample to be separated can be injected continuously into the system rather than in discrete quantities. The system may be able to separate a group of chemical species from another using the biphasic extractive liquid system. The chemical species may be separated based on the difference in their respective elution times, and the elution times may be dependent on the value of the partition coefficients the chemical species have in the biphasic liquid extractive liquid system.

As shown in FIG. 3, the liquid-liquid extractive chromatographic system may comprise a modular structure comprising 6 modular separator stages. Contrary to typical chromatographic systems that employ a mobile phase and a stationary phase, two mobile immiscible phases (e.g., first phase liquid 214 and second phase liquid 216) may be employed in this extractive chromatographic system and flow in a countercurrent fashion in the system. A feed liquid stream (e.g., feed liquid stream 212) comprising a mixture of solute A and solute B may be fed into one of the intermediate separator stages (e.g., intermediate separator stage 203). The two mobile immiscible phases may function as extraction liquids that can be used to extract and separate solute A and solute B in the feed liquid stream.

At each stage, the two mobile immiscible phases may be mixed outside the separation chamber (e.g., separation chambers 201, 202, 203, 204, 205, 206), using either dynamic or static (active or passive) mixing at various mixing regions (e.g., mixing regions 248), before entering the separation chamber as a mixed liquid stream comprising the two immiscible mobile phases and solutes A and B. During the dynamic or static mixing, solute A may preferentially associate with first phase liquid 214 and solute B preferentially associates with the second phase liquid 216 based on a difference in their partition coefficients. For example, while solute A may have a partition coefficient KA between the first liquid phase and second liquid phase of greater than 1, solute B may have a partition coefficient K B between the first liquid phase and the second liquid phase of less than 1. Inside each separation chamber, phase separation between the mixed liquid stream may carried out via membrane-based separation technology using an integrated pressure controller. A liquid comprising pure solute A solubilized in the first phase liquid (e.g., liquid 264) may be produced and a liquid comprising pure solute B solubilized in the second phase liquid (e.g., liquid 226) may be produced.

The system may include sensors, storage space and pumps in between each stage in order to store, pressurize and send upstream the phase moving in countercurrent direction. The feed liquid stream comprising the mixture of solutes may be inserted and mixed at a mixing region before any stage in the unit. The positioning of the feed liquid inlet for receiving the feed liquid stream may vary depending on the objectives of the separation process. The temperature of the biphasic liquid mixture throughout the system (e.g., associated with the mixing regions 248) may be controlled using a temperature control system (e.g., temperature control system 220). Overall, the system described herein may allow for facile modification of solvent composition or pH, and temperature throughout the operation. One or more in-line analytical measurements (e.g., IR or Raman measurements) may be employed to monitor the above-referenced physical properties.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be 5 closed or semi-closed transitional phrases, respectively, as set forth in the United States Patent Office Manual of Patent Examining Procedures, Section 2111.

What is claimed is:

1. A method, comprising:

transporting a feed liquid stream comprising a first solute and a second solute into a feed liquid inlet of a liquid-liquid chromatographic separator system, wherein the liquid-liquid chromatographic separator system comprises three or more separator stages arranged in series with one another from a first separator stage to a last separator stage, with one or more intermediate stages positioned between the first separator stage and the last separator stage;

transporting a liquid comprising at least a portion of the first solute and at least a portion of the second solute into a first liquid inlet of a first separator stage, such that the first separator stage produces:

a liquid having a mole fraction of the first solute relative to the sum of the first solute and the second solute that is larger than a mole fraction of the first solute relative to the sum of the first solute and the second solute in the liquid received by the first liquid inlet of the first separator stage, and a liquid having a mole fraction of the second solute relative to the sum of the first solute and the second solute that is larger than a mole fraction of the second solute relative to the sum of the first solute and the second solute in the feed liquid stream; and transporting a liquid comprising at least a portion of the first solute and at least a portion of the second solute into a last liquid inlet of the last separator stage, such that the last separator stage produces:

a liquid having a mole fraction of the first solute relative to the sum of the first solute and the second solute that is larger than a mole fraction of the first solute relative to the sum of the first solute and the second solute in the feed liquid stream, and a liquid having a mole fraction of the second solute relative to sum of the first solute and the second solute that is larger than a mole fraction of the second solute relative to the sum of the first solute and the second solute in the liquid received by the last liquid inlet.

2. The method of claim 1, wherein the liquid transported into the first liquid inlet is a mixed liquid stream comprising a first liquid phase and a second liquid phase immiscible with the first liquid phase.

3. The method of claim 2, further comprising forming the mixed liquid stream that is transported into the first liquid inlet by combining the first liquid phase from a source containing the first liquid phase with a liquid stream from a liquid outlet of at least one of the one or more intermediate separator stages.

4. The method of claim 1, wherein the liquid transported into the last liquid inlet is a mixed liquid stream comprising a first liquid phase and a second liquid phase immiscible with the first liquid.

5. The method of claim 4, further comprising forming the mixed liquid stream that is transported into the last liquid inlet by combining the second liquid phase from a source containing the second liquid phase with a liquid stream from a liquid outlet of at least one of the intermediate separator stages.

6. The method of claim 1, further comprising transporting a liquid comprising at least a portion of the first solute and at least a portion of the second solute into an intermediate liquid inlet of at least one of the one or more intermediate separator stages, such that the intermediate separator stage produces:

a liquid having a mole fraction of the first solute relative to the sum of the first solute and the second solute that is larger than a mole fraction of the first solute relative to the sum of the first solute and the second solute in the liquid received by the intermediate liquid inlet, and a liquid having a mole fraction of the second solute relative to the sum of the first solute and the second solute that is larger than a mole fraction of the second solute relative to the sum of the first solute and the second solute in the liquid received by the intermediate liquid inlet.

7. The method of claim 6, further comprising transporting at least a portion of the liquid that is produced by the at least one intermediate separator stage having a mole fraction of the first solute relative to the sum of the first solute and the second solute that is larger than a mole fraction of the first solute relative to the sum of the first solute and the second solute in the liquid received by the intermediate liquid inlet into a liquid inlet of a next separator stage.

8. The method of claim 7, wherein the next separator stage is the last separator stage or another intermediate separator stage.

9. The method of claim 6, further comprising transporting at least a portion of the liquid that is produced by the intermediate separator stage having a mole fraction of the second solute relative to the sum of the first solute and the second solute that is larger than a mole fraction of the second solute relative to the sum of the first solute and the second solute in the liquid received by the intermediate liquid inlet into a liquid inlet of a preceding separator stage.

10. The method of claim 9, wherein the preceding separator stage is the first separator stage or another intermediate separator stage.

11. The method of claim 6, wherein the liquid that is transported into the intermediate liquid inlet comprises a mixed liquid stream comprising a first liquid phase and a second liquid phase immiscible with the first liquid phase.

12. The method of claim 11, further comprising forming the mixed liquid stream that is transported into the intermediate liquid inlet by combining a liquid stream from a liquid outlet of the preceding separator stage and a liquid stream from a liquid outlet of a next separator stage.

13. The method of claim 1, furthering comprising operating the liquid-liquid chromatographic separator system continuously.

14. The method of claim 2, wherein the first solute has a partition coefficient $K_1$ between the first liquid phase and the second liquid phase of greater than 1.

15. The method of claim 14, wherein the second solute has a partition coefficient $K_2$ between the first liquid phase and the second liquid phase of less than 1.

16. The method of claim 2, wherein an extraction factor of the first solute ($Y_1$) is greater than 1.

17. The method of claim 16, wherein an extraction factor of the second solute ($Y_2$) is less than 1.

* * * * *